US009100989B2

(12) United States Patent
Ray et al.

(10) Patent No.: US 9,100,989 B2
(45) Date of Patent: Aug. 4, 2015

(54) METHOD AND APPARATUS FOR AD-HOC CONTENT SHARING

(71) Applicant: NOKIA Corporation, Espoo (FI)

(72) Inventors: Ian James Ray, Espoo (FI); Kimmo Lehtosalo, Helsinki (FI); Samuli Hanninen, Nummela (FI); Kari Juhani Leppanen, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 274 days.

(21) Appl. No.: 13/731,823

(22) Filed: Dec. 31, 2012

(65) Prior Publication Data

US 2014/0185499 A1  Jul. 3, 2014

(51) Int. Cl.
H04B 7/00        (2006.01)
H04W 84/18       (2009.01)
H04L 12/18       (2006.01)
H04L 29/12       (2006.01)
H04W 76/00       (2009.01)
H04L 29/08       (2006.01)
H04W 4/12        (2009.01)

(52) U.S. Cl.
CPC ............... H04W 84/18 (2013.01); H04L 12/18 (2013.01); H04L 12/1845 (2013.01); H04L 61/00 (2013.01); H04L 12/189 (2013.01); H04L 67/2828 (2013.01); H04W 4/12 (2013.01); H04W 76/002 (2013.01)

(58) Field of Classification Search
CPC ....................................................... H04W 84/18
USPC ............................................................. 370/310
See application file for complete search history.

(56) References Cited

U.S. PATENT DOCUMENTS 6,005,562 A * 12/1999 Shiga et al. .................... 715/721
2006/0195787 A1* 8/2006 Topiwala et al. .............. 715/700
2010/0179984 A1* 7/2010 Sebastian ....................... 709/203
2011/0141966 A1  6/2011 Kasslin et al.

* cited by examiner

Primary Examiner — Wei Zhao
(74) Attorney, Agent, or Firm — Ditthavong & Steiner, P.C.

(57) ABSTRACT

An approach is provided for discovering proximity-based and/or location-based services over an ad-hoc network. A request to share at least one content item from at least one device is determined. Further, one or more compressed representations of the at least one content item are generated, where the one or more compressed representations include at least one link for retrieving the at least one content item. Furthermore, the one or more compressed representations are broadcast in one or more broadcast messages over an ad-hoc network to one or more other devices.

18 Claims, 25 Drawing Sheets

FIG. 2F

| NETWORK LAYER MESSAGE HEADER 281 | TX 282 (TRANSMITTER NID) | SRC 283 (SOURCE NID) | DST 284 (DESTINATION NID) | MSN 285 (MESSAGE SEQUENCE NUMBER) | HOP COUNT 286 | GEOGRAPHICAL LIMIT 287 | TEMPORAL LIMIT 288 | CONTEXT LIMIT 289 |
|---|---|---|---|---|---|---|---|---|

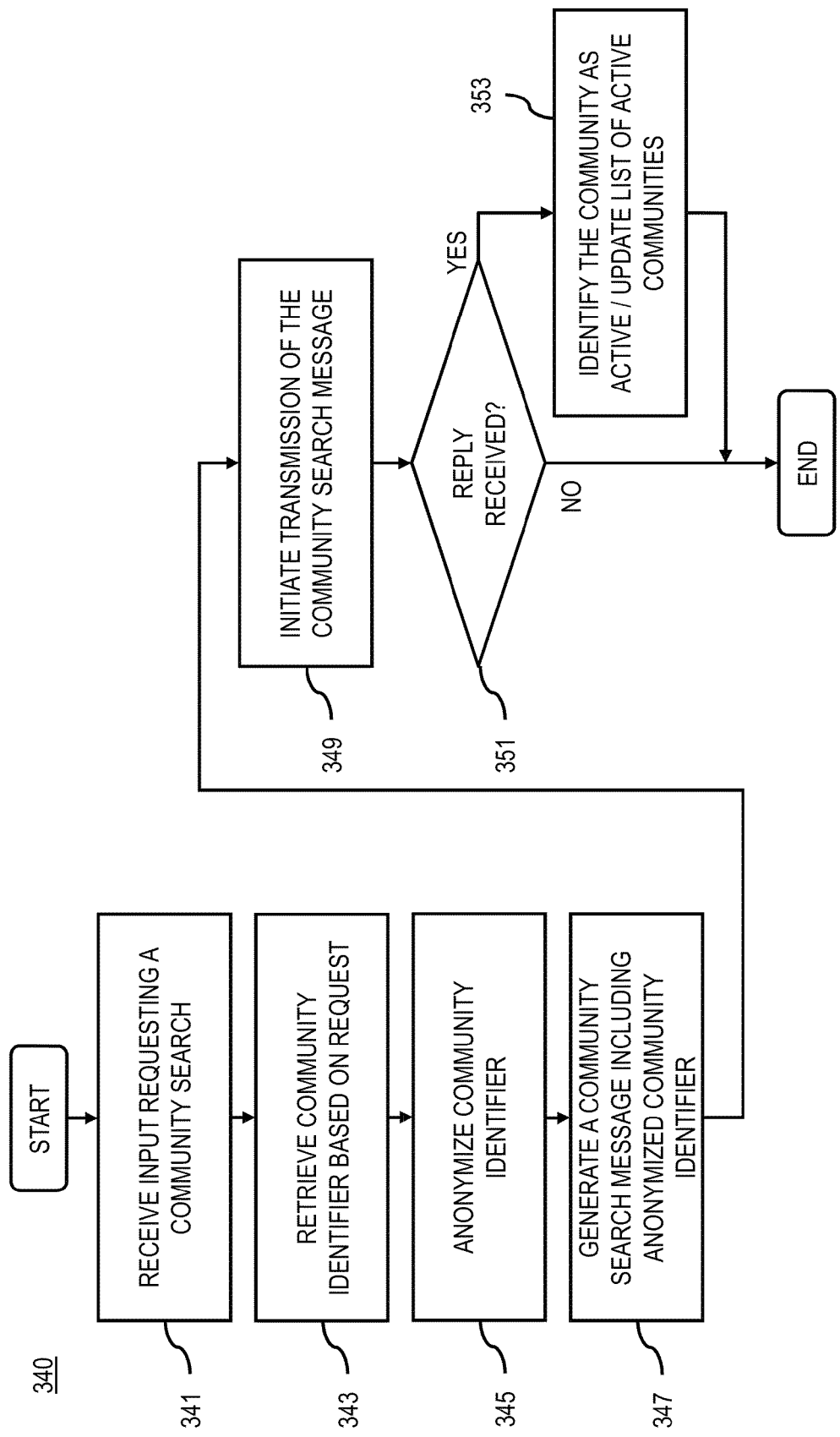

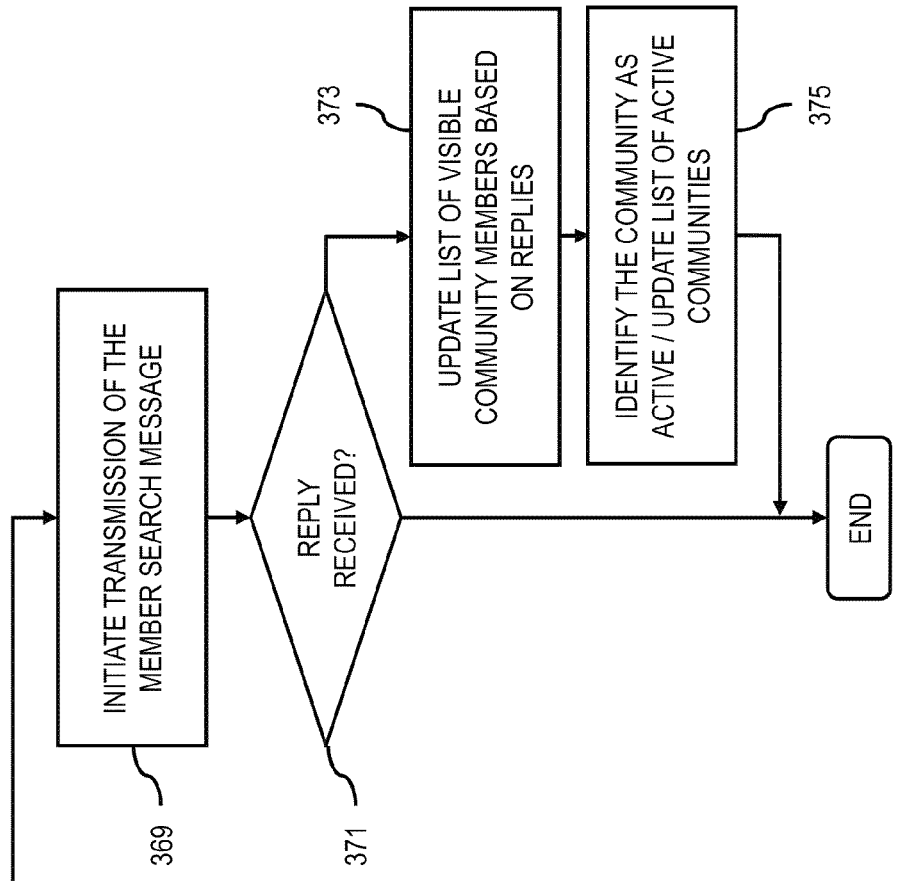
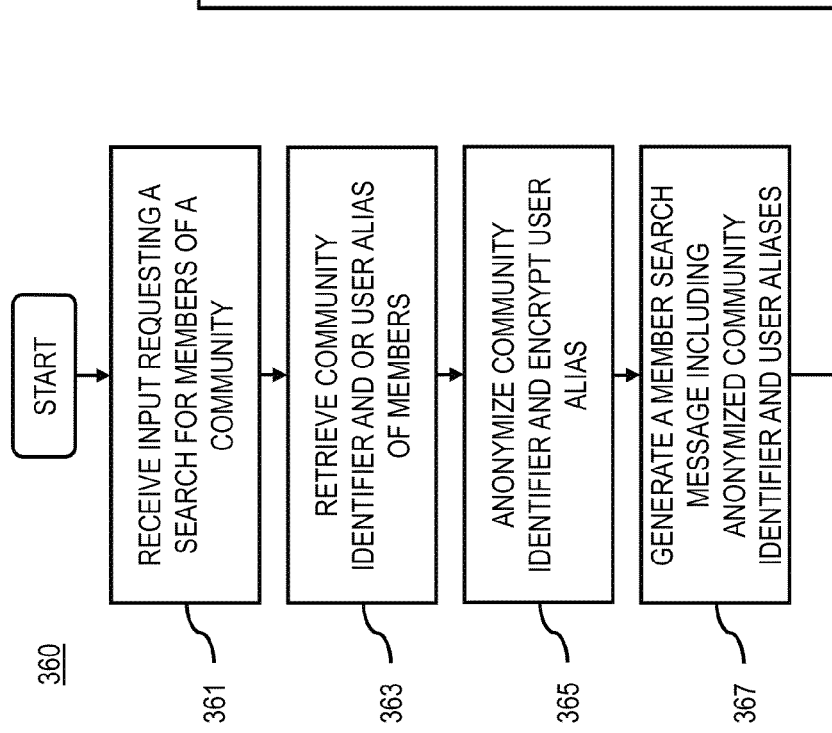
FIG. 3D

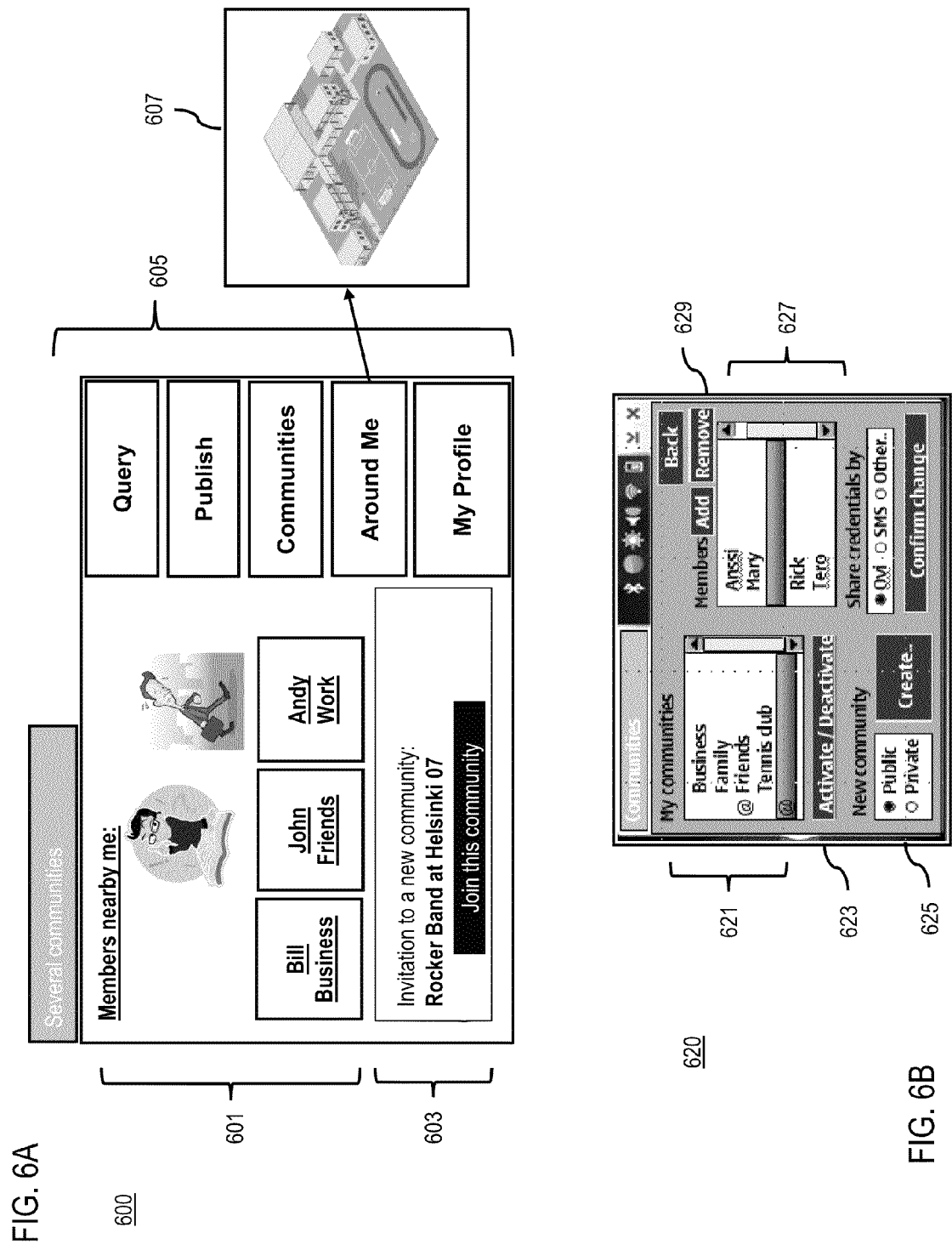

METHOD AND APPARATUS FOR AD-HOC CONTENT SHARING

BACKGROUND

Wireless (e.g., cellular) service providers and device manufacturers are continually challenged to deliver value and convenience to consumers by, for example, providing compelling network services, applications, and content. One area of development is users sharing content among devices in close proximity. However, technical challenges relating to establishing a communication session, power consumption, signaling overhead, security, and privacy have hindered such development.

SOME EXAMPLE EMBODIMENTS

Therefore, there is a need for an approach for broadcasting and receiving messages for content sharing among devices via an ad-hoc network.

According to one embodiment, a method comprises determining a request to share at least one content item from at least one device. The method also comprises causing, at least in part, a generation of one or more compressed representations of the at least one content item, the one or more compressed representations including at least one link for retrieving the at least one content item. Further, the method also comprises causing, at least in part, a broadcasting of the one or more compressed representations in one or more broadcast messages over an ad-hoc network to one or more other devices.

According to another embodiment, an apparatus comprises at least one processor, and at least one memory including computer program code for one or more computer programs, the at least one memory and the computer program code configured to, with the at least one processor, cause, at least in part, the apparatus to determine a request to share at least one content item from at least one device. The apparatus is further caused to cause, at least in part, a generation of one or more compressed representations of the at least one content item, the one or more compressed representations including at least one link for retrieving the at least one content item. Further, the apparatus is also caused to cause, at least in part, a broadcasting of the one or more compressed representations in one or more broadcast messages over an ad-hoc network to one or more other devices.

According to another embodiment, a computer-readable storage medium carrying one or more sequences of one or more instructions which, when executed by one or more processors, cause, at least in part, an apparatus to determine a request to share at least one content item from at least one device. The apparatus is further caused to cause, at least in part, a generation of one or more compressed representations of the at least one content item, the one or more compressed representations including at least one link for retrieving the at least one content item. Further, the apparatus is also caused to cause, at least in part, a broadcasting of the one or more compressed representations in one or more broadcast messages over an ad-hoc network to one or more other devices.

According to another embodiment, an apparatus comprises means for determining a request to share at least one content item from at least one device. The apparatus further comprises means for causing, at least in part, a generation of one or more compressed representations of the at least one content item, the one or more compressed representations including at least one link for retrieving the at least one content item. Further, the apparatus also comprises means for causing, at least in part, a broadcasting of the one or more compressed representations in one or more broadcast messages over an ad-hoc network to one or more other devices.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing any of the methods disclosed herein.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 2F is a diagram of the data structure of a network layer message header, according to an exemplary embodiment;

FIGS. 3A-3D are flowcharts of processes for locating communities and community members over an ad-hoc network, according to various embodiments;

FIGS. 6A-6B are diagrams of a user interface utilized in the process of locating communities over an ad-hoc network, according to various embodiments;

DESCRIPTION OF PREFERRED EMBODIMENT

A method and apparatus for broadcasting and receiving messages for content sharing among devices via an ad-hoc network. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "awareness information" refers to any content, information and/or context about a local environment as well as the users and communication devices within the local environment. By way of example, awareness information can be used to support applications for creating social networks, determining presence, determining contexts associated with a device, sharing content, advertising, searching for information, etc. Although various embodiments are described with respect to communities over an ad-hoc network, it is contemplated that the approach described herein may be used within any type of communication system or network. Further, a "wireless node" or a "node" may be any device and/or user equipment capable of wireless communication with other devices and/or user equipment directly and/or via one or more available wireless networks.

Figure 1:
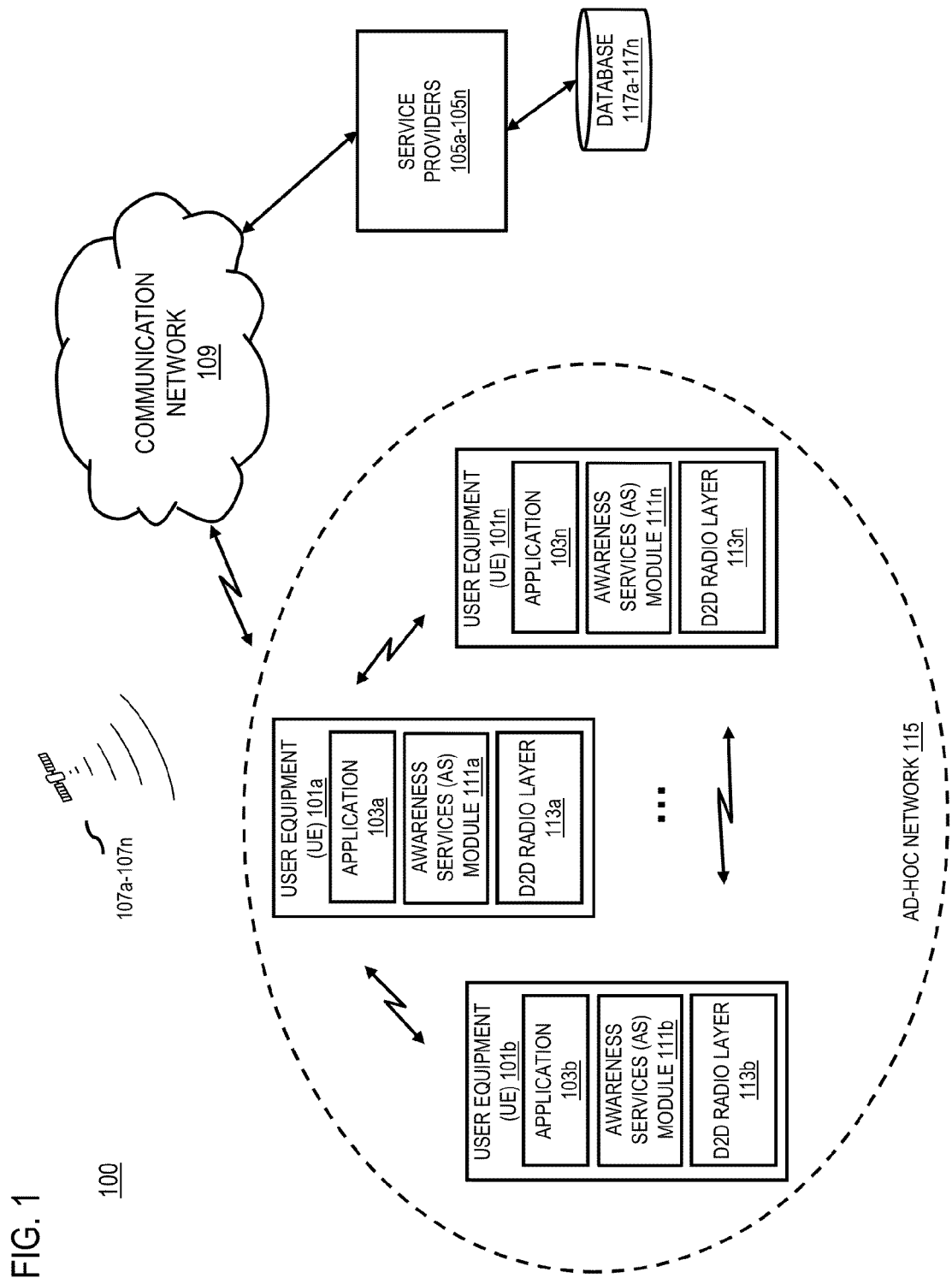
FIG. 1 is a diagram of a communication system capable of engaging in a service or activity using an ad-hoc mesh network, according to an embodiment.

FIG. 1 is a diagram of a communication system capable of engaging in a service or activity using an ad-hoc network, according to an embodiment. Information and context comprise "awareness information" that metaphorically equip a communication device with "radio eyes and ears" to continuously collect and exchange content and information with other devices in a local environment. However, development of a system for providing awareness information poses significant technical challenges, particularly in the areas of creating a network for sharing content and awareness information, locating and organizing awareness information, forming communities for sharing awareness information, managing power consumption for devices constantly engaged in sharing awareness information, developing applications to take advantage of the awareness information, maintaining the privacy and anonymity of users sharing awareness information, and preventing the proliferation of undesired messages (e.g., spam) over the network.

As shown in FIG. 1, in one embodiment, the system 100 includes user equipment (UE) 101a-101n (also collectively referred to as UE 101 and/or UEs 101), which may be utilized to execute one or more applications 103a-103n (also collectively referred to as application 103) including social networking, web browser, multimedia applications, user interface (UI), map application, web client, etc. to communicate with other UEs 101, one or more service providers 105a-105n (also collectively referred to as service providers 105), one or more GPS satellites 107a-107n (also collectively referred to as GPS satellites 107), and/or with other components of the system 100 directly and/or via communication network 109. In one embodiment, the UEs 101 may include awareness services module 111a-111n (also collectively referred to as AS module 111) for detecting and/or forming an ad-hoc network 115 for sharing awareness information with other UEs 101. In one embodiment, the UEs 101 may include D2D radio layer 113a-113n (also collectively referred to as D2D radio layer 113) utilized in formation of the ad-hoc network 115 and sharing of awareness information (see discussion of the D2D radio layer 113 in FIG. 2A below.) In addition, the UEs 101 can execute an application 103 that is a software client for storing, processing, sharing, and/or forwarding one or more content/information items to other UEs 101 and/or components of the system 100.

In one embodiment, the service providers 105 may include and/or have access to one or more databases 117a-117n (also collectively referred to as database 117), which may include various user information, user profiles, user preferences, one or more profiles of one or more user devices (e.g., device configuration, sensors information, etc.), service providers 105 information, other service providers' information, and the like. In one embodiment, the service providers 105 may include various service providers offering a range of services, for example, online shopping, social networking services (e.g., blogging), media upload, media download, media streaming, account management services, or a combination thereof. Further, the service providers 105 may conduct a search for content items, media items, information, coupons, and the like associated with one or more users, POIs, geo-locations, and the like.

In one embodiment, the UEs 101 may form the ad-hoc network 115 for sharing awareness information. The ad-hoc network 115 is, for instance, a connectionless and serverless device-to-device network (e.g., a mobile ad-hoc network (MANET)) created using short-range radio technology (e.g., wireless local area network (WLAN), Bluetooth®, etc.) Within the ad-hoc network 115, each UE 101 may be mobile and within communication range of any number of other UEs 101. Accordingly, the set of UEs 101 which may be within communication range of any other UEs 101 is transient and can change as the UEs 101 move from location to location and/or in and out of the communication range. In one embodiment, a user may connect to or disconnect from the ad-hoc network 115 on demand.

As discussed previously, service providers and device manufacturers that are developing communication systems and networks for providing awareness information face many technical challenges. For example, current ad-hoc radios (e.g., WLAN and Bluetooth®) are designed for connectivity (e.g., connectivity via Internet protocol (IP)). However, in an "always on" environment such as the ad-hoc network 115, may not be practical to have a large number of UEs 101 (e.g., mobile handset devices) "connected" by, for instance, IP to each other for extended periods of time because of power usage and scalability problems. Specifically, a multi-hop connection in a large ad-hoc network typically requires a significant amount of control signaling and power and can quickly deplete a mobile device's battery. Moreover, scalability can be a problem because current ad-hoc radios are typically limited in the number of connections and the related signaling that they can support at any given time. Another shortcoming of current ad-hoc radios is that they do not adequately protect a user's privacy because they expose the user's identity through a fixed network address (e.g., a media access control (MAC) address) associated with the user's device.

To address these problems, the system 100 provides a method for establishing the ad-hoc network 115 for sharing awareness information in a connectionless fashion. As used herein, the term "connectionless" refers to the ability of a node (e.g. a UE 101) to send to and receive from all surrounding nodes (e.g., other UEs 101) awareness information without the need to send any prior control signaling. For example, sending awareness information using the transmission control protocol/IP (TCP/IP) over a WLAN ad-hoc is not connectionless because of the two-way TCP control signaling between the sending and receiving nodes used to establish the TCP connection. The awareness information is provided, for instance, in small anonymous messages that are exchanged by the UEs 101 automatically without or with minimal user setup and/or intervention. As used herein, the term "anonymous" means that it is not possible to infer the true identity of the sender from the message, unless the true identity is intentionally included in the message (e.g., by the user or another entity authorized by the user). The exchange of awareness information occurs as a broadcast message (i.e., a flooding message) from a UE 101 to neighboring UEs 101 that are within range of the radio of the broadcasting UE 101. As neighboring UEs 101 receive the broadcasted message, each receiving UE 101 may in turn rebroadcast the message to other neighboring UEs 101. In this way, the originally broadcasted message may propagate (e.g., hop) throughout the ad-hoc network 115. In various embodiments, the extent of the propagation may be limited by criteria such as distance, location, time, user preference, etc.

In an ad-hoc network, traditionally, the messages may be utilized for carrying small sized awareness information messages among the UEs 101. However, within the system 100, content items (e.g., sample/indicator files of compressed media containing voice, video, images, etc.) may also be broadcast via the messages among the between UEs 101. Further, the messages may also contain pointers to the content or a small amount of data (e.g. presence or context information) to minimize the data traffic transported over the ad-hoc network 115. The UEs 101 may then access the content using other communication channels (e.g., via IP through the communication network 109). In addition, the system 100 eliminates the problems associated with traditional methods for route establishment and maintenance (e.g., connection based communication protocols), such as maintaining and handing off connections as mobile devices move, and requiring high levels of network resources for maintaining connections in an environment with a high number or density of mobile devices. For example, the event of a UE 101 appearing/disappearing to/from the network does not generate any control signaling in the ad-hoc network 115. Similarly, the system 100 creates routing information only when needed to route replies to queries back to the querying UE. The routing information is generated by using the query messages alone (i.e. no control signaling is used for creating routing information). After the query and subsequent reply process is completed, the routes are forgotten. In other words, the query/reply process of system 100 provisions routes for a reply to provide awareness information on demand rather than pushing awareness information from one UE 101 to another. In various embodiments, both push (e.g., information is published over the ad-hoc network 115) and pull (e.g., information is queried from other UEs 101 of the ad-hoc network 115) modes of disseminating awareness information are possible. In certain embodiments, it is contemplated that the pull mode of operation can be used instead of the push mode to help suppress potential spam messages.

Moreover, the system 100 optimizes the power consumption of UEs 101 communicating over the ad-hoc network 115 to enable always-on operation without seriously affecting the battery life of the UEs 101. For instance, by utilizing only short awareness messages, by eliminating the need for any route maintenance signaling, by employing procedures to minimize transmission and reception of duplicative messages and by enabling an efficient sleep scheme for the short-range device-to-device radio used within each UE 101 (allowed by the low latency requirements typical of an awareness information network), the system 100 can potentially provide hundreds of hours (e.g., over 400 hours) of continuous operation of each UE 101 between battery charges in a mobile device. The system 100 could be seen as a "nervous system" between the mobile devices, where small messages ("nerve impulses") are continuously exchanged by the mobile devices ("neurons") in order to bring awareness to the user of a mobile device about the user's surroundings (e.g., content, information, status, etc.)

The system 100 also enables the development of new services and applications based on awareness information (e.g., social networking applications, location-based applications, application for determining presence, applications for determining context, advertising applications). In particular, the continuous and immediate nature of the awareness information with respect to local environment enables compelling new services. For instance, awareness information may be combined with the increasingly available storage and computing power in mobile devices (e.g., UEs 101) to create a local semantic web, whereby local awareness information is created and searched for automatically by the UEs 101 within the ad-hoc network 115. As used herein, the term "semantic web" refers to a system in which the information and messages shared with the system is understandable by the UE 101 within the system. It is noted that establishing such a local semantic web using the system 100 overcomes two major problems blocking the development of a global semantic web: (1) lack of mechanism for providing semantic content on a large scale, and (2) lack of semantically aware search engines to help users find information in a semantic web. The system 100 can also be used for collaborative context calculation, publishing pointers to information or content, search for friends within a defined community, finding out what is going on and what kind of people are around a user, making the environment aware of the user, and other like applications.

In various embodiments and use case scenarios, users may realize advantages and benefits of the system 100 when sharing awareness information via an ad-hoc network with an easy device discovery and sharing process, and no additional costs to the user.

In one use—case scenario, the system 100 provides the capability to initiate content sharing with one or more individuals and/or groups over the ad-hoc network 115. For example, a user has a content item (e.g., picture, music, etc.) that he would like to share with neighboring users over the ad-hoc network. In another example, supporters of a football team form a fan club community/group over the ad-hoc network 115 wherein the community members can send short text messages (e.g., of small enough size to be sent directly over the ad-hoc network 115) that can be received and read only by the community members of that particular team. In another example, a user may wish to share pictures of a party with a certain group of people via the ad-hoc network, wherein the user provides a key (e.g., via other messaging means) to the group so that they may be able to access and view the pictures.

In one use-case scenario, an application via an ad-hoc network enables locally targeted advertising and couponing. For example, a user is in a book/music store where wireless nodes (e.g., a kiosk, a listening post, etc.) in the store broadcast small samples of music and audio book readings via an ad-hoc network, whereby the user may listen to the samples and via a user interface on a UE 101 select one or more of the content samples (e.g., icons) for receiving additional samples or information about the selections. In one example, the user may choose to receive (e.g., rent, purchase, etc.) the entire content item via an available network capable of delivering the selected content item. In one example, the store may offer a discount if a user listens to the content samples and then decides to purchase the actual content items. In another example, a user uses a UE 101 to download or capture an image/video of a point of interest (POI) (e.g., a lake house, an antique automobile, etc.) which he wishes to share with other users via an ad-hoc network. In another example, a user wishes to share a document including interesting quotes and facts that he just discovered in his content library.

In one use-case scenario, an application provides proximity-based, location-based, or context-based services using awareness information. For example, a UE 101 may not have positioning capabilities but nonetheless knows that it is in a shopping mall based on anonymous awareness information from other nearby UE 101a and/or wireless nodes. It is contemplated that an establishment (e.g., a store) may also utilize a wireless node (e.g., a UE 101b, a kiosk, an advertising module, etc.) to provide context information, possibly combined with other establishment specific information such as the address of the establishment's web address. The UE 101a may then remind the user to "Remember to buy a gift for your mom's birthday" based on the user's location in the mall and an event reminder associated with the user. The awareness information can also be physical position information from a neighboring UE 101b that has positioning capability, wherein the positioning information from the UE 101b may enable a UE 101a without such capability to offer navigational services.

In one embodiment, the system 100 determines a request to share at least one content item from at least one device. In one embodiment, the AS module 111 may receive the request from a user via a UI option at a UE 101 indicating that the user wishes to share one or more content items. For example, a user may wish to share a picture he just captured on his UE 101. In one embodiment, the AS module 111 may receive the request via the application 103 at the UE 101 which, for example, may be based on contextual information, location information, trigger conditions, and the like. For example, the application 103 may prompt to share one or more coupons available on a UE 101a with other UEs 101 when the UE 101a is at a particular location (e.g., at a restaurant), at a particular time (e.g., during lunch), with particular group of users (e.g., any students), and the like.

In one embodiment, the system 100 causes, at least in part, a generation of one or more compressed representations of the at least one content item, the one or more compressed representations including at least one link for retrieving the at least one content item. In one embodiment, the AS module 111 and/or the application 103 may generate a compressed representation (e.g., a summary, a small number of bytes of data, etc.) of the content item available for sharing, wherein the compressed representation may include a sample, an indicator, contextual information, content type, content metadata, and the like, whereby a recipient of the compressed representation may be able to ascertain, at least, some information associated with the content item available for sharing. For example, only a small section of an audio content item (e.g., an audio fragment, a wave form, etc.) may be included, or a picture may be highly minimized, or a sample of a textual content may be shown as simple text, etc.

In one embodiment, the system 100 causes, at least in part, a broadcasting of the one or more compressed representations in one or more broadcast messages over an ad-hoc network to one or more other devices. In one embodiment, the AS module 111 of a UE 101 may generate one or more messages including one or more compressed representations of one or more content items for broadcast via an ad-hoc network to one or more other UEs 101, for example, from a source device to one or more target/destination devices. In one embodiment, the AS module 111 may generate the messages in conjunction with the application 103, wherein the application 103 may determine one or more components of the compressed representations.

In one embodiment, the ad-hoc network operates in a low-power mode of the at least one device, the one or more other devices, or a combination thereof, and wherein the retrieving of the at least one content item operates in a higher-power mode of the at least one device, the one or more other devices, or a combination thereof. In one embodiment, the UEs 101 participating in an ad-hoc network may broadcast and/or receive one or more compressed representations while the UEs 101 operate in a lower-power mode, for example transmit in low-power mode, in order to save battery power, maintain a low interference with other transmissions, control broadcast range, and the like. For example, in a low-power operating mode, the ad-hoc network 115 may allow continuous broadcasting and reception of messages by the UEs 101 in time-synchronized connectionless manner (as depicted in FIG. 2G and in discussion of FIG. 2A) without significant effect on the battery life time. Further, in one embodiment, the UEs 101 may operate in a higher-power mode when transmitting and/or receiving the one or more shared content items via the ad-hoc network. For example, in a higher-power mode, the UEs 101 may operate in a more conventional way of using peer-to-peer wireless radio in a connection-oriented mode, where the content is typically transferred using IP between the UEs 101. In one embodiment, the AS module 111 may facilitate the transmission and/or the reception via one or more other available networks (e.g., WLAN, Bluetooth, NFC, cellular, etc.) that may be capable of (e.g., more power, better bandwidth, more efficient, etc.) receiving and retransmitting the one or more shared content items. In one embodiment, the retrieving is via an Internet Protocol network, a cellular network, or a combination thereof, wherein the IP address of a receiving and/or a transmitting UE 101 and a transmitting component (e.g., a service provider) may be used during the retrieval.

In one embodiment, the one or more compressed representations include one or more identification (ID) codes, one or more UI icon codes, or a combination thereof associated with the one or more compressed representations, the at least one content item, or a combination thereof. In one embodiment, the AS module 111 of a sharing UE 101 may include and/or instead utilize an ID code or a UI icon code to indicate to the receiving UEs 101 as to what a compressed representation and/or a content item may actually be, wherein the receiving UEs 101 may decode the ID and/or UI icon codes (e.g., from a library) and present the associated information and/or icons at the receiving UEs 101. In one embodiment, utilization of the ID and/or UI icon codes may provide for more efficient transactions via the ad-hoc network, for example, smaller message size, less power for transmission, less time on the ad-hoc network, and the like.

In one embodiment, the broadcasting of the one or more compressed representations, the at least one content item, or a combination thereof is based, at least in part, on geo-location, contextual information, or a combination thereof associated with the one or more other devices. For example, an ad-hoc message may indicate that the message may be broadcast within a certain geo-location (e.g., range), or by UEs 101 including certain contextual information associated with the UE 101 and/or a user of the UE 101, and the like. In one embodiment, the at least one content item is available for sharing in substantially real-time. In one embodiment, the one or more compressed representations are valid based, at least in part, on a predetermined duration of time. In one example, a user sharing a content item may indicate a short duration wherein the content item may be available, valid, and/or may be transmitted for sharing. In one embodiment, one or more parameters of the ad-hoc network may allow for content items to be available for sharing for a certain period of time, for example, to avoid aggregated content on the network which can result higher traffic and power consumption by all devices.

In one embodiment, the system 100 determines one or more sharing rules associated with the at least one content item. In one embodiment, the AS module 111 and/or application 103 on a broadcasting UE 101 (a sharing device) may determine one or more sharing rules, for example, from the UE 101 user preferences, metadata/contextual information of a content to be shared, location of the UE 101, a target recipient group, any security keys, and the like before the content item is broadcast. In one embodiment, the AS module 111 and/or the application 103 may re-determine the sharing rules based on one or more changes/updates to the user profile of a sharing device, geo-location change, change in time, and the like.

In one embodiment, the system 100 causes, at least in part, the broadcasting of the one or more compressed representations based, at least in part, on the one or more sharing rules. In one embodiment, the AS module 111 may determine a broadcast time, location, device power level, and the like.

In one embodiment, the system 100 causes, at least in part, a generating of the one or more compressed representations based, at least in part, on one or more types of the at least one content item, the at least one device, the one or more other devices, resource availability at the ad-hoc network, or a combination thereof. In one embodiment, the at least one content item includes an image, a video, an audio, a textual, or a combination thereof content item type. In one embodiment the AS module 111 may determine the type of the content item to be shared, for example, from metadata associated with the content item and further determine a compressed representation based on the type. In one embodiment, the application 103 may determine the type of the content to be shared and determine the compressed representation. For example, the content to be shared may be an audio file which may need to be sampled for determining an appropriate (e.g., audible, small size, etc.) compressed representation. In one embodiment, a coarser sample (e.g., digitally sampled at a lower rate) of the content item (e.g., audio, image, video, etc.) may be generated for a proper size message in the ad-hoc network.

In one embodiment, the system 100 causes, at least in part, a presentation of the one or more compressed representations at the one or more other devices based, at least in part, on one or more user defined parameters at the one or more other devices. In one embodiment, a user may define one or more parameters/preferences via the AS module 111 for receiving certain types of messages via the ad-hoc network. For example, a user may only wish to receive messages related to sports, automobiles, music, books, cooking, and the like. Further, the user may wish to receive messages that are substantially near real-time (e.g., only a few hops via other UEs 101), that are for a certain interest group (e.g., students of a college), are from a certain nearby location, and the like. In one embodiment, the application 103 may determine one or more parameters of a compressed representation in a message for filtering the messages of the ad-hoc network based on the user defined parameters, user history, user preferences, and the like.

Figure 2A:
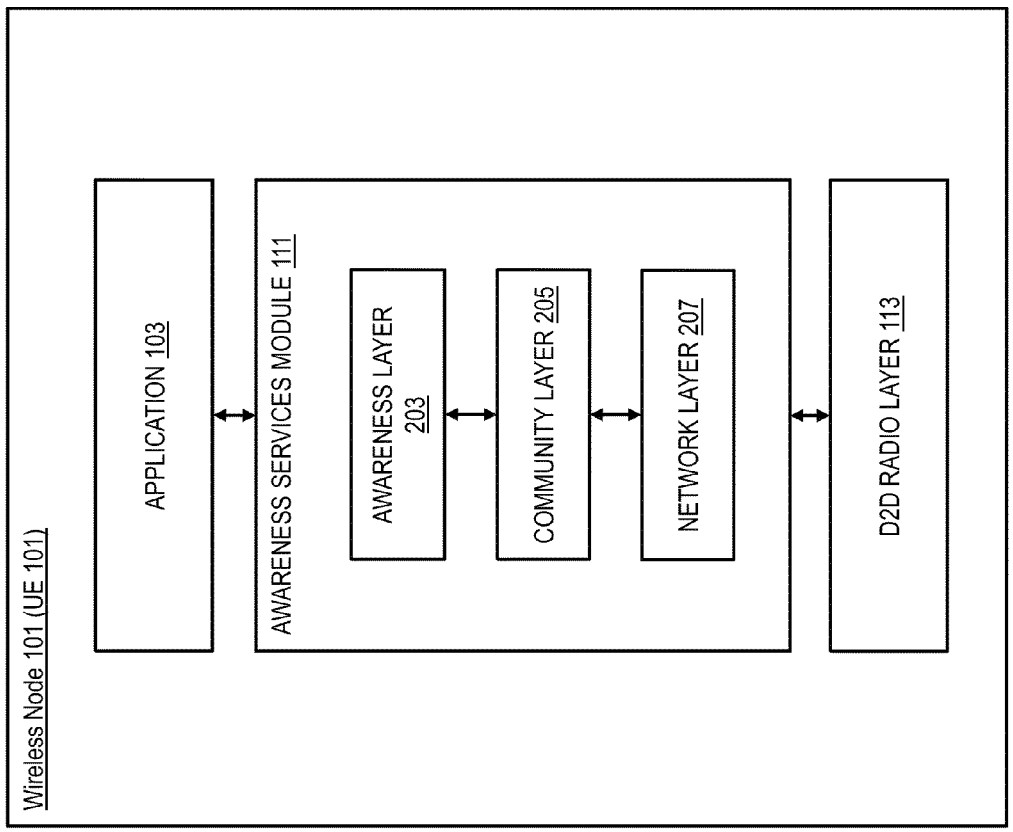
FIG. 2A is a diagram of the components of a wireless node including an awareness services module, according to an embodiment.

FIG. 2A is a diagram of the components of a wireless node including an awareness services module, according to an embodiment. FIG. 2A is described with respect to FIGS. 2B-2E which are diagrams of the components of an awareness services module, according to various embodiments. As shown in FIG. 2A, a wireless node 101 (e.g., a UE 101) may include one or more components for sharing awareness information within the ad-hoc network 115. It is contemplated that the functions of these components may be combined in one or more components or performed by other components of equivalent functionality. In one embodiment, the wireless node 101 includes the application 103 that uses awareness information to provide various services and functions including social networking, location-based services, presence information, context determination, advertising functions, etc. The application 103 may interact with the AS module 111 to obtain or share awareness information.

Figure 2B:
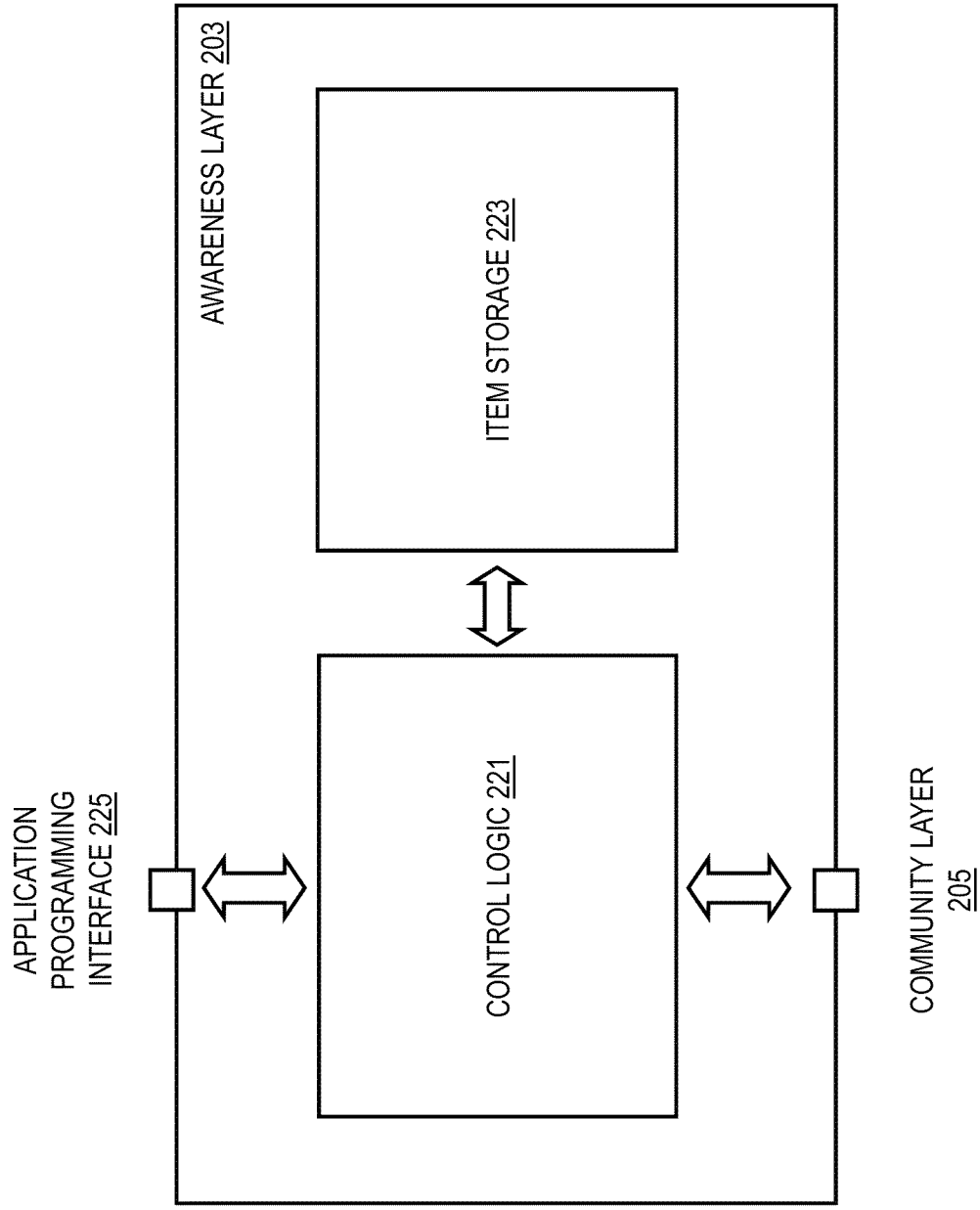
FIGS. 2B-2E are diagrams of the components of an awareness services module, according to various embodiments.

By way of example, the AS module 111 includes three layers: an awareness layer 203, a community layer 205, and a network layer 207. The awareness layer 203 is the highest control layer for sharing awareness information. As shown in FIG. 2B, the awareness layer 203 includes a control logic 221 and item storage 223. The control logic 221, for instance, provides the logic for creating, publishing, querying, and receiving awareness information over the ad-hoc network 115. The control logic 221 can store the information that it either creates or receives in the item storage 223. It is contemplated that the item storage 223 may be of sufficient size to store all or a portion of the information that flows through the wireless node 101 over a configurable period of time (e.g., days, months, or years).

In various embodiments, the control logic 221 enables querying and dissemination of awareness information by initiating the broadcasting of the query or information to neighboring UEs 101 within the ad-hoc network 115. For example, upon receiving a query, the UEs 101 in the local neighborhood that have the queried information reply to the querying node automatically. In various embodiments, the reply information is also automatically stored in the item storage 223 of each wireless node 101 through which the propagating reply passes. Moreover, the reply to a query may result in return of a pointer to specific content relevant to the query rather than the content itself under certain circumstances (e.g., when the specific content is large in size). It is contemplated that the reply may contain direct content if the content is relatively small (e.g., a few tens of bytes of information). By using a pointer, the system 100 minimizes the data traffic that flows through the ad-hoc network 115. The user may then access the content via the pointer (e.g., a universal resource locator (URL) address, IP address) via a more appropriate communication protocol (e.g., IP) and/or means of communication (e.g. infrastructure networks). The receipt of the pointer (e.g., IP address) may automatically trigger the transfer of the content using, for instance, the communication protocol associated with the pointer. In the case of broadcasting or publishing information, any wireless node 101 through which the published information propagates may store the information in item storage 223 of the wireless node 101.

In various embodiments, awareness information can also be published directly by broadcasting an awareness message. Such a push mode for the dissemination of awareness information can be used to support some applications (e.g. advertising or group chatting) over the ad-hoc network 115.

It is recognized that privacy and anonymity may be of concern to users of the system 100. Accordingly, the control logic 221 provides mechanisms for ensuring privacy and anonymity. For example, the control logic 221 can prevent the transmission of intimate information when the number of neighboring wireless nodes is small to prevent the possibility of inferring identity. As used herein, the term "intimate information" refers to information directly related to the user, e.g., the user's habits, tastes, or preferences (musical preferences, favorite restaurants, etc.).

The control logic 221 may also periodically broadcast decoy queries and replies to make tracking an individual wireless node 101 more difficult. Since an outside observer does not know the authentication key associated with a community, the observer cannot distinguish a valid message from a fictitious one. Accordingly, by observing decoy messages, the observer is likely to detect presence of a private community when there is not one. Additionally, the control logic 221 enables to user to define filters for incoming information (e.g., filter advertisements) and how these filters would work (e.g., ignore the information completely, relay the information but do not store, etc.). It is also contemplated that the user can direct the control logic 221 to control the user's visibility on the ad-hoc network 115 (e.g., no visibility, visible only to a certain community or other user) to maintain privacy. As another mechanism for protecting privacy, the control logic 221 can interact with the community layer 205 to anonymize a specific message and corresponding identifiers as described below with respect to the community layer 205.

Because one of the goals of the system 100 is to provide a mechanism for anonymous spreading of awareness information, it is recognized that undesired or unsolicited messages (e.g., spam messages) may become a problem. To address this problem, the control logic 221 may obtain, for instance, information from the lower system layers of the AS module 111 about the traffic load and current average power consumption. If the traffic load is medium or high (meaning that also power consumption related to system 100 is medium or high) restrictions may be set for the frequency at which broadcasting messages are sent by the control logic 221. It is also contemplated, that the neighboring peer nodes 101 can be configured to not forward any broadcasting messages originating from a node 101 neglecting such message restrictions.

The awareness layer 203, together with the community layer 205, provide an application programming interface (API) 225 to enable an application 103 to access the functions of the control logic 221 and the item storage 223. In various embodiments, the API 225 enables application developers to have uniform and easy access to functions related to sharing awareness information over the ad-hoc network 115. It is contemplated that the API 225 is extensible to accommodate any application designed to access or use awareness information. The applications in the various nodes 101 do not have to be the same or mutually compatible. It is sufficient that the applications use the API correctly to be able to publish and search awareness information in the surrounding nodes 101.

The awareness layer 203 also has connectivity to the community layer 205. The community layer 205 controls the formation and cataloging of communities of UEs 101 within the ad-hoc network 115. By way of example, a user may create any number of communities for sharing awareness information. It is contemplated that a community may be either a peer community (e.g., any wireless node 101 may join), a personal community (e.g., a wireless node 101 may join only if invited), or the open local community that consists of all nodes in the local neighborhood. In various embodiments, the messages that traverse between the UEs 101 within the ad-hoc network 115 belong to one of these three community types. Communities can either be private (messages are encrypted) or public (no encryption used). In various embodiments, membership and status in a community affect how the wireless node 101 shares awareness information (see the discussion with respect to FIG. 2C for additional details of community membership).

Figure 2C:
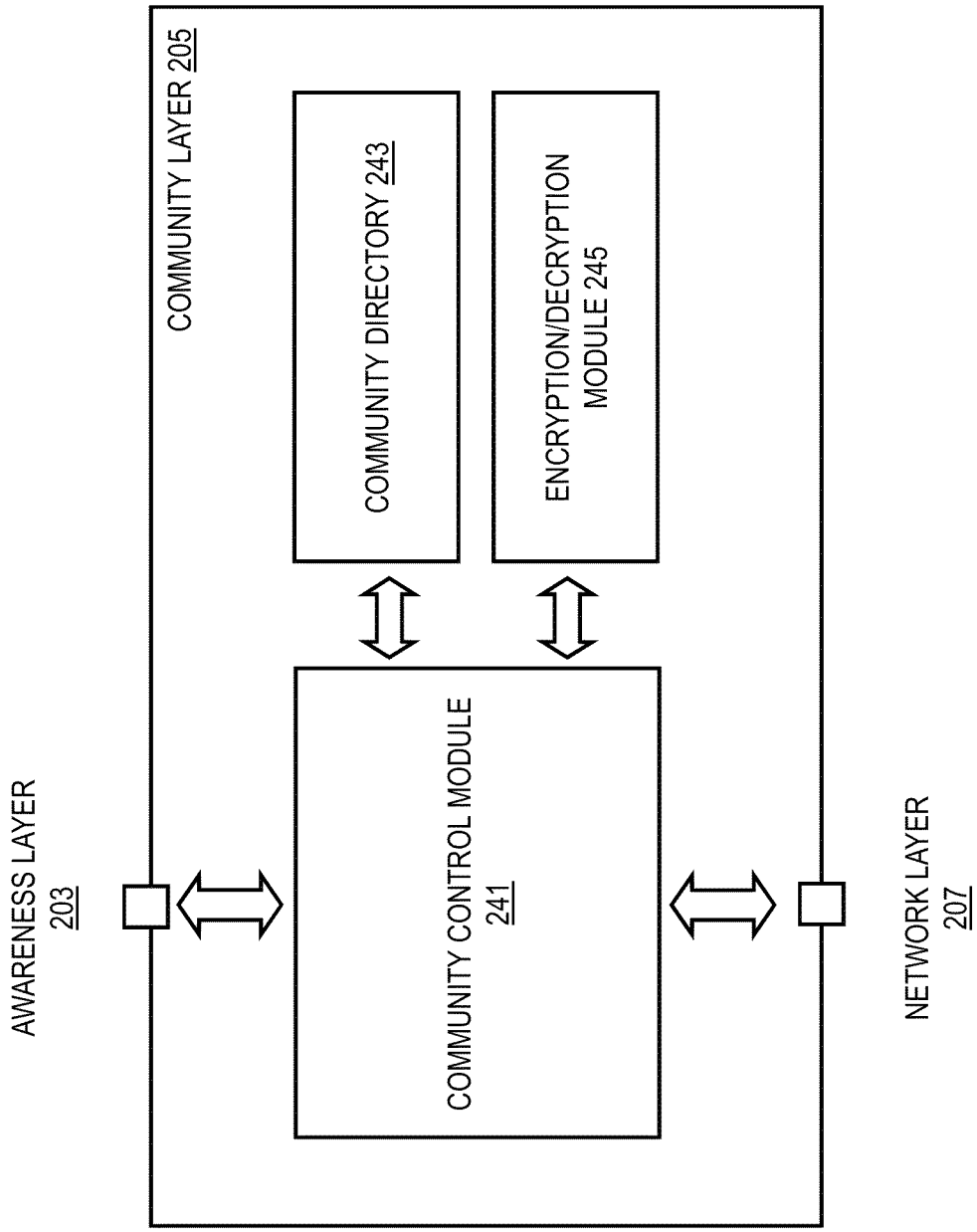

Furthermore, a community may be created for any purpose or duration (e.g., a permanent work community, a permanent community of friends, and a temporary community of concert goers lasting only the duration of the concert). As shown in FIG. 2C, the community layer 205 includes a community control module 241, a community directory 243, and an encryption/decryption module 245. The community control module 241 provides the logic for creating, joining, managing (e.g., updating membership, configuring settings and preferences, setting privacy policies), and deleting communities. The module 241 also provides part of the API 225.

In various embodiments, the community control module 241 assigns a unique community identification number (CID) to each community for use within the ad-hoc network 115. The control module 241 can also generate authentication keys K associated with the CID to, for instance, authenticate users who wish to join the community or authenticate messages directed to the community. For example, a wireless node 101 may invite another wireless node 101 to join a community by transferring the CID and authentication keys associated with the community to the other wireless node 101. It is contemplated that the transfer of the CID and corresponding authentication key may occur using short range radio or using another secure mechanism (e.g., short message service (SMS) or electronic mail). It is noted that both peer and personal communities use a CID and corresponding K, whereas the open local community either can use a predetermined value for CID (e.g., zero) or does not use the CID at all.

To ensure privacy (as discussed above), the community control module 241 interacts an encryption/decryption module 245 to anonymize the CID when including the CID in messages over the ad hoc network 115. For example, a wireless node 101 may direct a query to a specific community using an anonymized CID (e.g., a pseudonym) associated with the community in lieu of the actual CID. In various embodiments, multiple anonymized CIDs may be used to represent a single community. In this way, it is more difficult to identify queries corresponding to a particular community by monitoring traffic within the ad hoc network 115. From the perspective of an outside observer, the anonymized CIDs look random. In addition, the encryption/decryption module 245 may encrypt or decrypt message data using, for instance, a temporary key that is periodically derived from the authentication key K associated with the CID. These measures hinder the discovery of the CID by outsiders that do not have the authentication key. By way of example, the community layer 205 inserts a special header into the messages that it receives from the awareness layer 203. The special header, for instance, contains a list of anonymized community identifiers corresponding to the communities to which the message is relevant.

Figure 2D:
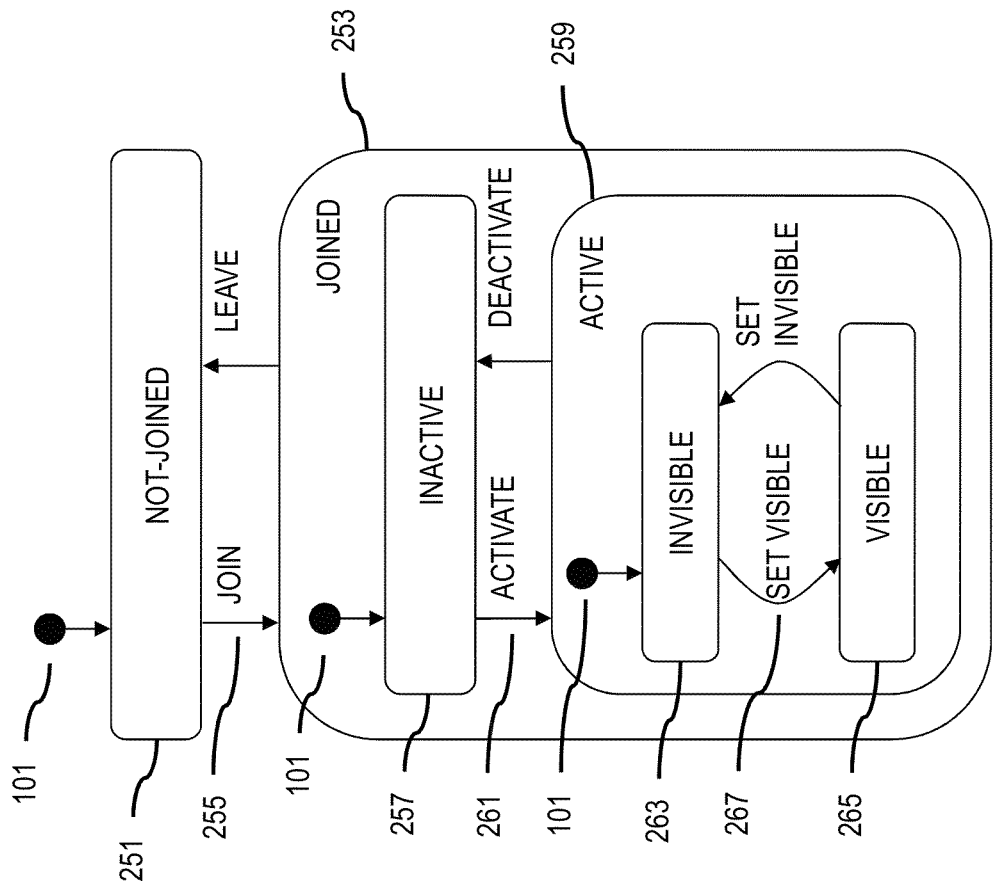

FIG. 2D is a state diagram of the effect of community membership and status on sharing awareness information, according to an exemplary embodiment. As shown in FIG. 2D, a wireless node 101 may be in either one or two states (e.g., a not-joined state 251 and a joined state 253) with respect to membership in a community within the ad-hoc network 115. The application 103 of wireless node 101 issues, for instance, a command 255 to either join or leave a community to transition between the not-joined state 251 and the joined state 253. When the wireless node 101 is in the not-joined state 251 with respect to a community, the wireless node 101 has no information (e.g., CID and associated authentication keys K) about the community and cannot access messages directed to the community. When the wireless node 101 is in the joined state 253, the community layer 205 receives the CID and possibly one or more authentication keys associated with the community. In one embodiment, authentication keys are provided when membership in the community is by invitation or otherwise restricted (e.g., when the community is a personal community or a private community). Accordingly, the community layer 205 will be able to encrypt outgoing community specific messages and to decrypt incoming community specific messages.

When the wireless node 101 is in the joined state 253, the wireless node 101 may also be in either an inactive state 257 or an active state 259. To transition between the inactive state 257 and the active state 259, the application 103 may issue a command 261 to either activate or deactivate the joined state 253 via the application programming interface 225. When the wireless node 101 is in the inactive state 257, the community layer 205 abandons the message even though it is a member of the community. In certain embodiments, the wireless node 101 may also be invisible to other members of the community while in the inactive state 257. For example, the wireless node 101 may enter the inactive state 257 when it temporarily does not want to receive or share information with the community.

When the wireless node 101 is in the active state 259, the community layer 205 encrypts and decrypts community messages as usual for private communities, and enables all outgoing and incoming community specific messages for public communities (e.g., communities with no restrictions on membership).

Within the active state 259, the wireless node 101 may also be in either an invisible state 263 or a visible state 265. To transition between the invisible state 263 and the visible state 265, the application 103 issues a command 267 to set either the visible or invisible state. When in the invisible state 263, the community-specific identity (e.g., a user alias) associated with the wireless node 101 cannot be queried by other members of the community. For example, in the invisible state 263, the community layer 205 continues to receive and send community messages without its identity known to other community members. When in the visible state 265, the identity of the wireless node 101 can be queried by other members of the community.

In various embodiments, the community directory 243 of the community layer 205 maintains, for instance, information on the communities that the user has joined. Such information contains, at least, the community identification (CID). Additionally, it may contain public and/or private authentication keys (K) of the joined communities and a list of anonymized community identifiers for each community. The community control module 241 may periodically recalculate the list of anonymized CIDs. By way of example, the community layer 205 inserts a header into the message it receives from the awareness layer 203. The header contains, for instance, a list of anonymized community identifiers identifying the communities to which the message is relevant.

It is contemplated that a special personal community can be reserved for tracking new bonds or relationships created between users. Consider, for example, that user A meets user B for the first time and wants to create a radio bond between the mobile devices corresponding to each user. In one embodiment, user A can initiate the creation this bond with user B by transferring to user B (e.g., by using a secure transfer mechanism) the CID and the public K of user A's personal "new bonds" community. Similarly, user B may give user A similar credentials corresponding to user B's "new bonds" community. Once the credentials are exchanged and the bond has been created, user A may find user B over the ad-hoc network 115 by searching for members of user A's "new bonds" community. In other words, with a simple search of a single community, user A can search for all the people in user A's local neighborhood with whom user A has created a bond. This requires that a high number of community CIDs and Ks can be stored in the community directory 243. Also, an effective lookup of the community directory must be provided. There are many existing and good solutions for such efficient lookup.

As the user creates new bonds, the number community CIDs and Ks stored in the user's community directory 243 can grow quite large. Accordingly, to enable effective search of a large number of communities, the community layer 205 may generate a special community search message to initiate the search. For example, the special community search message contains, at least in part, a list of anonymized community identifiers corresponding to the communities to be searched. To protect the privacy, the community layer 205 can generate a new set of anonymized community identifiers for each community search message. If the community layer 205 finds a match to any of the anonymized community identifiers in any of the neighboring nodes 101 that receives the search message, the community layer 205 generates a reply message that may contain the alias of the user in that community or other community specific information. The reply message may be encrypted with the encryption key of the community.

Figure 2E:
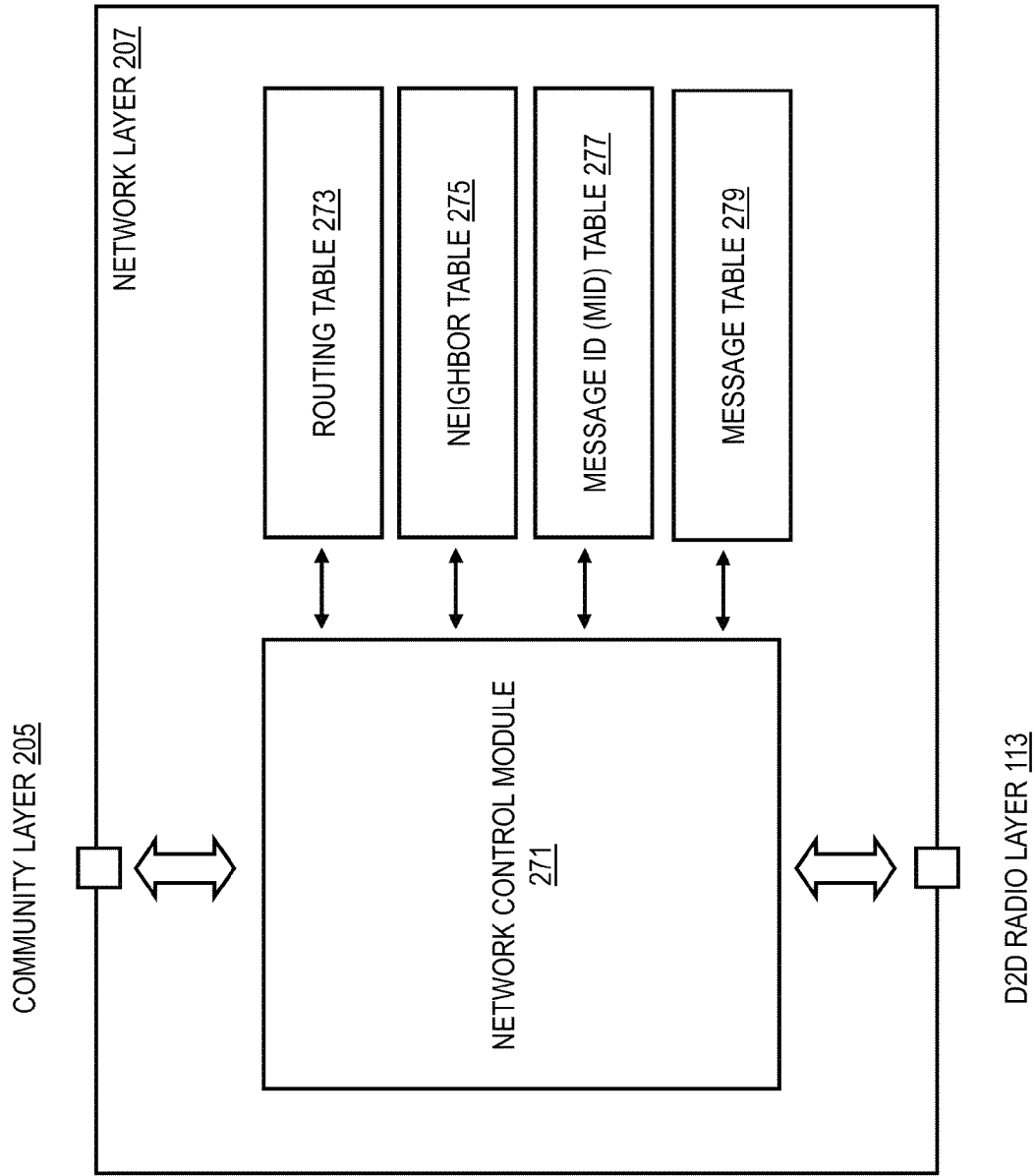
Figure 2G:
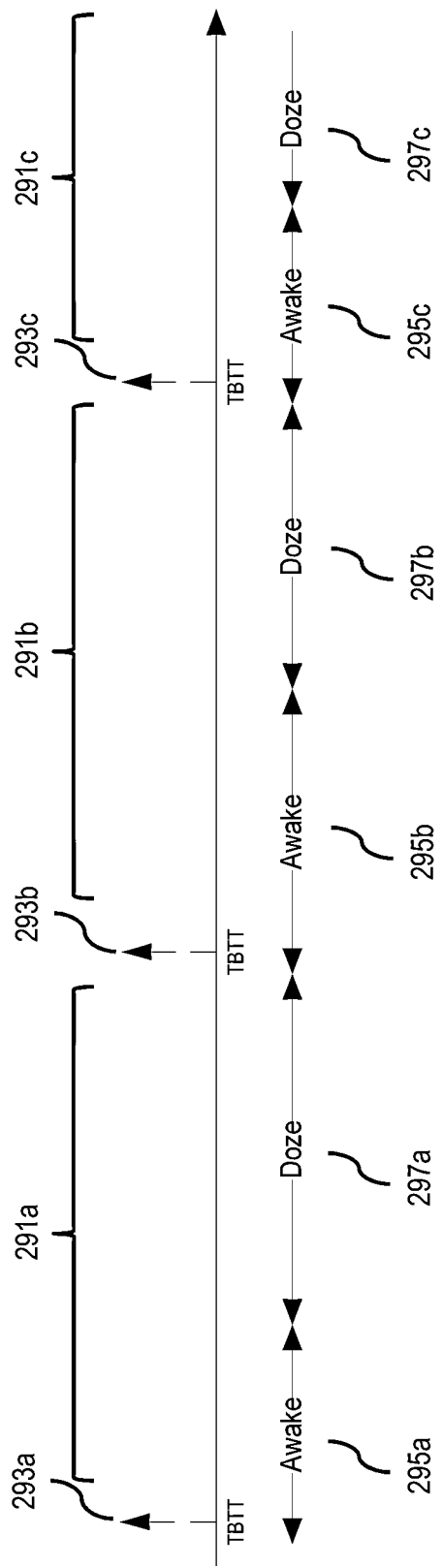
FIG. 2G is a diagram depicting a power saving scheme of a device-to-device radio layer, according to an embodiment.

As shown in FIG. 2C, the community layer 205 has connectivity to the awareness layer 203 above and the network layer 207 below. The network layer 207 manages the rebroadcasting of received broadcasting messages and the routing of the unicast (typically reply) messages received by the wireless node 101. FIG. 2E depicts a diagram of the components of the network layer 207, according to an exemplary embodiment. The network layer 207 includes a network control module 271, routing table 273, neighbor table 275, message identification (MID) table 277, and message table 279. The network control module 271 directs the broadcasts of messages and information by managing and updating the routing table 273, neighbor table 275, MID table 277, and message table 279. In certain embodiments, the network control module 271 may also assist in protecting the privacy and anonymity of users by periodically changing the network layer identification associated with the wireless node 101. It is noted that making such a change in the network layer identification between queries does not cause routing problems for replies because the routing information is recreated by each query in the ad-hoc network 115.

In various embodiments, the network layer 207 may insert a header into messages it receives from the community layer 205 to, for instance, direct broadcasting and routing of the received messages. The structure of this network layer message header 281 is discussed with respect to FIG. 2F. FIG. 2F is a diagram of the data structure of a network layer message header, according to an exemplary embodiment. As shown, the message header 281 contains the following fields: (1) a TX field 282 to identify the transmitter node ID (NID) of the last transmitting node 101; (2) a SRC field 283 to identify the source node ID of the node 101 that originated the message; (3) a DST field 284 to identify the destination source ID of the intended recipient of a unicast (reply) message (e.g., this field is give a value of zero when the message is a broadcasting messages); (4) a MSN field 285 to identify the message sequence number assigned by the source node; and (5) a hop count field 286 that is incremented by one by each node 101 that transmits the message. In certain embodiments, the message header 281 may also contain the following optional fields: (6) a geographical limit field 287 to designate the extent of the physical over which the message is intended to propagate (e.g., the geographical limit field 287 may contain a geographical position of the source node and a maximum broadcasting radius from that position); (7) a temporal limit field 288 (e.g., the temporal limit field 288 may contain the time when the message becomes obsolete and should be dropped); and (8) a context limit field 289 that defines the context beyond which the message is not intended to propagate (e.g. a message related to a particular concert is not intended to extend beyond the concert venue).

Returning to FIG. 2E, the network layer 207 also contains a routing table 273. In various embodiments, the routing table 273 contains a listing of the node identification number (NID) of the originating wireless node 101 (e.g., source NID) and the NIDs of the last known transmitters of the message. The purpose of the routing table is to enable the routing of the reply messages (e.g., unicast messages) back to the querying node that originated the query through a broadcasting message. As the message propagates through the ad-hoc network 115, each subsequent wireless node 101 that receives the message adds the NID of the last transmitter to the routing table to record the next hop neighbor towards the source node. The source node is marked as the destination node (DST) in the routing table. Also the message sequence number of the message is recorded. The update of the routing table 273 is coordinated by the network control module 271. As shown in Table 1, the routing table 273 lists the destination NID, the transmitter NIDs associated with UEs 101 that have rebroadcasted a message and the MSN of the message.

TABLE 1

| Destination NID | Transmitter NIDs | Message Sequence Number |
| --- | --- | --- |
| $DST_1$ | $TX_{11}, TX_{12}, \ldots, TX_{1M}$ | $MSN_1$ |
| $DST_2$ | $TX_{21}, TX_{22}, \ldots, TX_{2N}$ | $MSN_2$ |
| ... | ... | |
| $DST_S$ | $TX_{S1}, TX_S, \ldots, TX_{ST}$ | $MSN_S$ |

The neighbor table 275 contains a list of the neighboring UEs 101 and an estimate of their relative radio distance (see Table 3). It is contemplated that the observed signal strength together with the known transmitting power of a neighboring wireless node 101 is an indicator of the proximity of the wireless node 101 and can be used to calculate the relative radio distance. The relative radio distance of the node from which the message was last received is then used as a criterion for whether or not the wireless node 101 retransmits a received message. For instance, a higher signal strength indicates closer proximity to the wireless node 101. The network control module 271 monitors the signal strengths of neighboring nodes 101 as the module 271 receives messages from nearby devices and uses it to estimate the relative radio distance (e.g., proximity of the transmitting node 101). It is also contemplated that the network control module 271 may use any other mechanism for estimating the relative radio distance of neighboring nodes (e.g., estimating location using global positioning satellite receivers or other positioning techniques).

In certain embodiments, the network control module 271 uses the proximity information to direct the routing and transmission of messages over the ad-hoc network 115. For example, the system 101 can reduce the potential for overloading the ad-hoc network 115 by implementing a smart broadcasting scheme whereby only a few nodes 101 retransmit a broadcasting message. Whether a node 101 retransmits a broadcasting message can be dependent on the relative distance group (e.g., "very near", "near", or "far") to which the node 101 that is the transmitter of the message belongs. More specifically, if the transmitting node 101 is in the "far" or "near" group, the receiving node 101 can retransmit the broadcasting message. If the transmitting node 101 is in the "very near" group, the receiving node 101 does not retransmit the broadcasting message. For each broadcast message received from a node in either the "far" or "near" group, the network control module 271 assigns a random delay time for relaying or rebroadcasting. The delay period, for instance, exhibits a distribution function based on the estimated relative radio distance as a way to randomize the delay period before transmission. The distribution should be chosen in such a way that the random delay is larger for those nodes that are "near" than for those that are "far." This favors, for instance, nodes 101 that are further away to relay the broadcasting message forward, which results in better broadcasting efficiency (smaller total number of transmissions). The use of a random delay time also prevents the unintended synchronization of message broadcasts as the message propagates over the ad-hoc network 115. For example, unintended synchronization of the message broadcasts may result in too many nodes 101 sending broadcasting (i.e., flooding) messages over the ad-hoc network 115 at exactly the same time. Additionally, the delay time provides an opportunity for the network control module 271 to monitor and count rebroadcasts of the message by other neighboring UEs 101.

TABLE 2

| Transmitter NID | Relative Radio Distance |
|---|---|
| $TX_1$ | $D_1$ |
| $TX_2$ | $D_2$ |
| ... | ... |
| $TX_T$ | $D_T$ |

The MID table 277 contains a list of received messages. As the wireless node 101 receives messages from neighboring nodes over the ad hoc network 115, the network control module 271 uses the MID table to check whether the message has been received previously by, for example, comparing the MIDs in the MID table 277 to that of the received message. The MID table 277 also contains a flag indicating whether a message has been transmitted by the node 101 and the time when the entry was last updated. In various embodiments, the MID is the tuple (SRC, MSN), where SRC is the NID of the source node and MSN is a message sequence number assigned by the source node. In this way, the MID is a unique identifier of each message that propagates in the network 115. The network control module 271 makes an entry in the MID table 277 for all new messages that it receives. If the message has been scheduled for transmission, the module 271 increments the message counter in the message table (see Table 4).

TABLE 3

| MID | Sent flag | Time of reception |
|---|---|---|
| $(SRC_1, MSN_{11})$ | "SENT" | $t_{11}$ |
| $(SRC_1, MSN_{12})$ | "NOT SENT" | $t_{12}$ |
| ... | ... | ... |
| $(SRC_2, MSN_{21})$ | "NOT SENT" | $t_{21}$ |

The message table 279 contains messages that the network control module 271 has scheduled to transmit. For example, as the node 101 receives a broadcasting message that the network control module 271 schedules for transmission, the module 271 updates the message table to include the message in the message table 279. Each entry in the message table 279 contains the message itself, the time when the message is scheduled to be sent, and the number of receptions of the same message by the node 101 (see Table 4). In various embodiments, a message is not relayed over the ad-hoc network 115 if the number of times the message has been received exceeds a predefined limit. For example, a message has the initial count of 0. In this example, as a wireless node 101 in the neighborhood is observed to transmit the message, the message count associated with the message is increased. When the maximum message count is reached, the network control module 271 removes the message from the message table 279. The transmitter of each message is also associated with an estimated relative radio distance (D) indicating whether the transmitting node is within close proximity of the wireless node 101 (e.g., transmitting node 101 is in the "very near" relative radio distance group) or far from the wireless node 101 (e.g., transmitting node 101 is in the "far" relative radio distance group). If the relative radio distance associated with the transmitting node indicates that the transmission of the message occurred "very near," the wireless node 101 would not have to relay the message because it is assumed, for instance, that most of the other neighboring UEs 101 have already received the same message. By taking into account the relative radio distances of neighboring nodes, the described smart broadcasting functionality leads to, on average, each broadcasting message being received for a few times by each node 101 independent of the node density. The number of times a message is received by any one node 101 affects the scalability of the network 115.

If the received message, however, is a unicast reply message that was addressed to the receiving node 101, the network control module 271 checks whether the destination node 101 can be found in the routing table 273 (e.g., can be found from the destination field in the reply message, or obtained from the source field of the query by the replying node). If found, the routing table entry will give the NID of the neighboring node to which the reply message will be sent in the next opportunity. If the unicast transmission is not successful, the next entry for the same DST will be used as the next try. If the received message is a unicast reply message that was not addressed to the receiving node, and no acknowledgment from the intended receiver node was heard, the node will store the message in the message table 279 for scheduled retransmission. It is noted that unicast messages or acknowledgement messages that are not addressed to the node 101 are normally received D2D radio layer 113 (see discussion of the D2D radio layer 113 below) but not by the AS module 111. However, under certain circumstances, the D2D radio layer 113 can provide such messages to the AS module 111 to schedule for retransmission. For example, if no successful unicast of the same message is observed by the time when the message is scheduled to be transmitted, the node 101 will transmit the unicast or acknowledgement message to the intended recipient found from the routing table 273 associated with the message. In this way, the nodes 101 that are not the intended recipients of the reply messages can assist in routing the message forward towards the correct destination.

TABLE 4

| Message | Time to send | Received msg count |
|---|---|---|
| $MSG_1$ | $t_1$ | $C_1$ |
| $MSG_2$ | $t_2$ | $C_2$ |
| ... | ... | ... |
| $MSG_M$ | $t_M$ | $C_M$ |

As shown in FIG. 2A, the AS module 111 has connectivity to a device-to-device (D2D) radio layer 113. The D2D radio layer 113 enables the formation of the ad-hoc network 115 and sharing of awareness information using, for instance, short range radio technologies such WLAN and Bluetooth®. It is contemplated that the D2D radio layer 113 may use any wireless technology for communication between devices over short ranges. The radio technology, for instance, enables each wireless node 101 within the ad-hoc network 115 to broadcast messages in a connectionless way to the neighboring nodes 101 that are within radio range. As used herein, the term "connectionless" means the UEs 101 need not use two-way signaling to establish a communication channel before broadcasting a message. In various embodiments, the D2D radio layer 113 may include multiple radios using one or more different technologies or protocols (e.g., WLAN and Bluetooth® simultaneously). A wireless node 101 configured with multiple radios may act as a gateway node to span two or more sub-networks serviced by the different wireless technologies. In this way, messages broadcast on one sub-network may be propagated to another sub-network.

FIG. 2G is a diagram depicting a power saving scheme of a device-to-device radio layer, according to an exemplary embodiment. The small amount of awareness data as well as the low latency requirements of the system 100 enables the operation of the D2D radio layer 113 in a way that leads to low power consumption. As shown in FIG. 2G, the D2D radio layer 113 may have beaconing periods 291a-291c delineated by target beacon transmission times (TBTTs) 293a-293c. In various embodiments, the D2D radio layer 113 may operate in a time-synchronized manner and utilize only a fraction of the time for active communication (e.g., during awake periods 295a-295c). During the rest of each beaconing period 291, the D2D radio layer 113 is in, for instance, a power-saving or dozing mode (e.g., during doze periods 297a-297c). For example, each beaconing period 291 can be on the order of hundreds of milliseconds and each awake period 293 only a few milliseconds, leading to effective radio utilization of approximately one percent. It is contemplated that for situations, where the number of nodes 101 is very large (such as during mass events), time-wise radio utilization can increase up to 100 percent momentarily (e.g., awake period 293 equals active transmission period 291). At times of low traffic (for example at night), the radio utilization can be decreased to, for instance, 0.1 percent, by utilizing every tenth awake period 293 while still maintaining synchronization.

Figure 14:
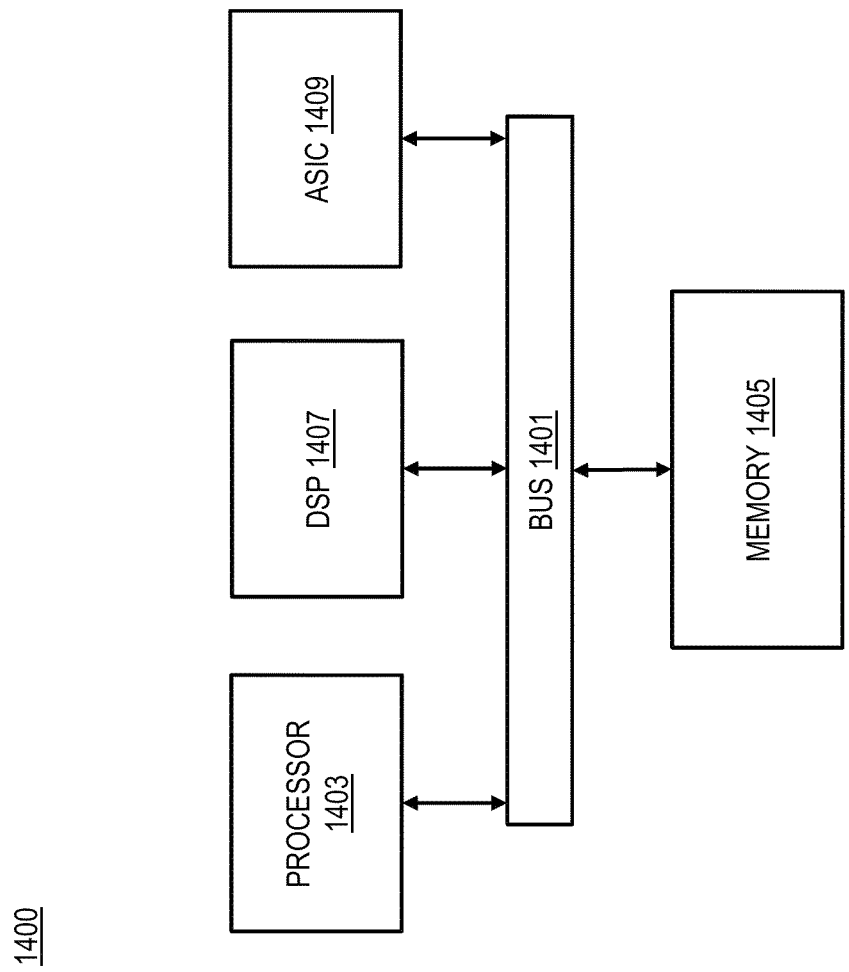
FIG. 14 is a diagram of a chip set that can be used to implement an embodiment of the invention.

In various embodiments, the low latency requirements also enable saving power in the host processor (e.g., as depicted in FIG. 14). For illustration, the following description refers to the components of exemplary chip set of FIG. 14. The D2D radio layer 113 is typically implemented in the ASIC module 1409, whereas the functionalities of the AS module 111 can be implemented either in the ASIC 1409 or the processor 1403. If the functionalities of the AS module 111 are implemented in the processor 1403, power consumption is reduced by, for instance, having ASIC 1403 wake up the processor 903 as infrequently as possible. By way of example, the periodic operation of the D2D radio layer 113 explained above enables the ASIC 1403 to collect all messages and send them to the processor 1403 at a frequency of once per active transmission period 291. The processor 903 then processes all received messages and calculates new messages to be sent for the next active transmission period 291. The processor 1403 then sends the messages to the ASIC 1403 for transmission. Using this process, a broadcasting message can make one hop (e.g., travel from one node 101 to another node 101) per period 291, which is fully acceptable for awareness information. In contrast, potential delays of hundreds of milliseconds are not possible, for example, for voice traffic, and these kinds of power savings cannot therefore be achieved in other communication systems transporting delay-sensitive traffic.

Figure 3A:
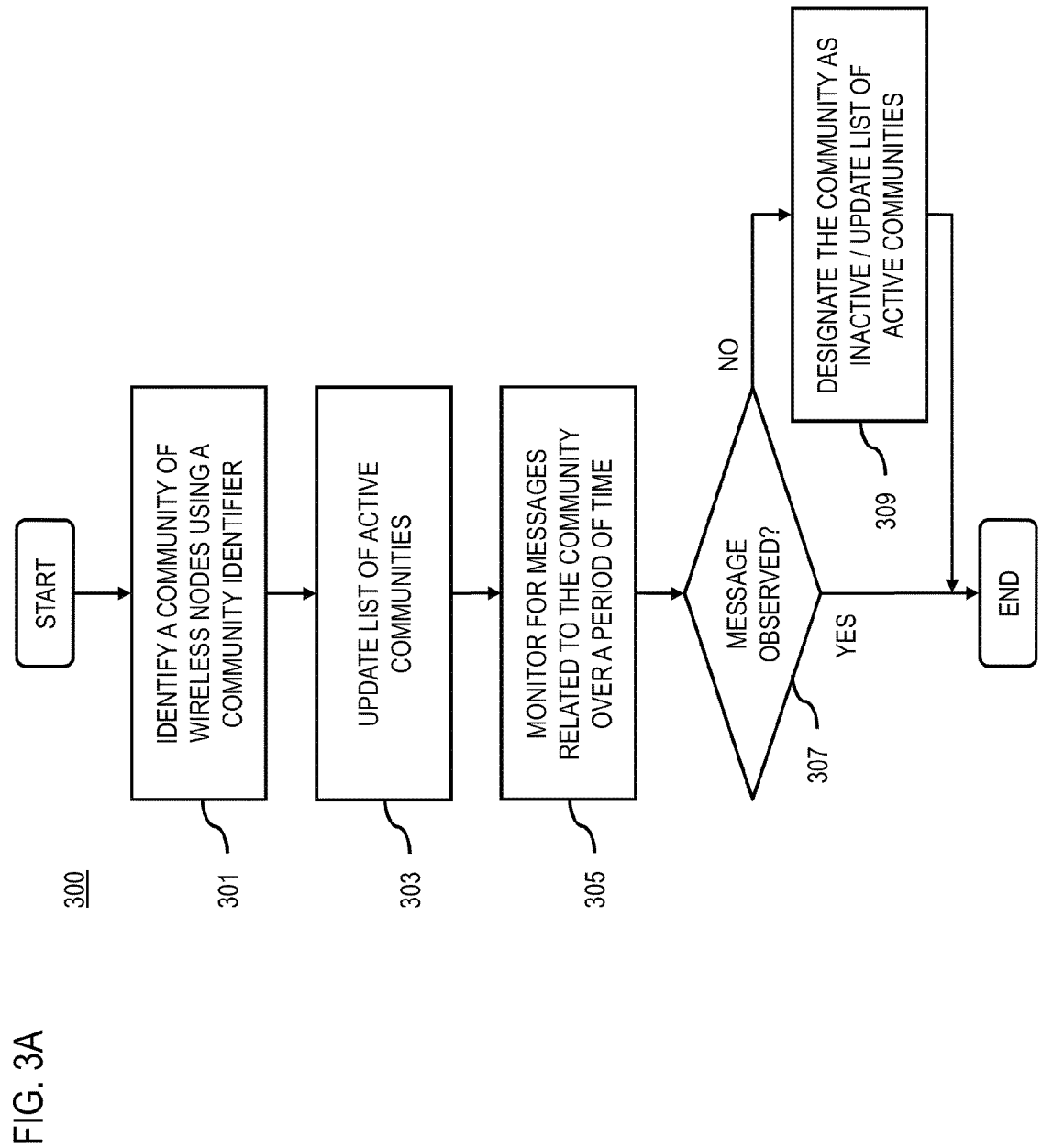

FIGS. 3A-3D are flowcharts of processes for locating communities and community members in the local neighborhood over an ad-hoc network, according to various embodiments. FIG. 3A is a flowchart for locating active communities over the ad-hoc network 115 and updating a list of the active communities that are visible to a wireless node 101. In one embodiment, the AS module 111 performs the process 300 of FIG. 3A and is implemented in, for instance, a chip set including a processor and a memory as shown in FIG. 14. In step 301, the AS module 111 identifies one or more communities of UEs 101 by using, for instance, community identifiers (CIDs) corresponding to the one or more communities. In various embodiments, each CID is associated with one or more authentication keys for authenticating members and messages transmitted within the corresponding community. The CIDs and associated keys are stored by the AS module 111 in, for instance, the community directory 243 and may be provided to UEs 101 that are members of the community in advance using a secure communication channel over the ad-hoc network 115 or the communication network 109. CIDs and keys that are created subsequently may also be provided using a secure communication channel over either the ad-hoc network 115 or the communication network 109.

By way of example, the AS module 111 can use the CIDs to locate and identify communities that are active (e.g., transmitting or receiving community messages) among one or more neighboring UEs 101 by (1) passively monitoring messages directed towards one or more communities over the ad-hoc network 115 using the process described with respect to FIG. 3B below, (2) actively searching for one or more communities using a community search message as described with respect to FIG. 3C below, and/or (3) actively searching for one or more members of the communities using a member search message as described with respect to FIG. 3D. The AS module 111 then updates a list of active communities based on the identification (step 303). For example, the list of active communities includes those communities to which the wireless node 101 belongs (e.g., communities that are private such as a community of personal friends) and those communities that are public and open to all nodes 101 (e.g., a general community of all wireless nodes on the ad-hoc network 115 in which system wide messages may be exchanged).

In various embodiments, the AS module 111 is continuously updating the list of active communities by, for instance, monitoring for messaging traffic over the ad-hoc network 115 related to one or more of the active communities (step 305). More specifically, the AS module 111 tracks whether there are any messages originating from or directed to one or more of the active communities over a predetermined period of time. In one embodiment, the period of time can be dependent on the on the density or stability of neighboring UEs 101. For example, if the composition of the neighboring UEs 101 is changing rapidly, the time period can be shorter. Similarly, if the composition of the neighboring UEs 101 is more stable, the time period can be longer. In either case, the AS module 111 observes whether there are any messages related to one or more of the active communities (e.g., by checking the header information of the messages for CIDs corresponding to any of the active communities) (step 307). If no messages are observed over the predetermined period of time for a particular community, the AS module 111 designates that community as inactive and updates the list of active communities accordingly (step 309). If a message related to a particular community is observed during the time period, the community is considered to be still active and the AS module 111 need not update the list of active communities. It is contemplated that the awareness services module can continuously or periodically perform the monitoring process to update the list of active communities.

Figure 3B:
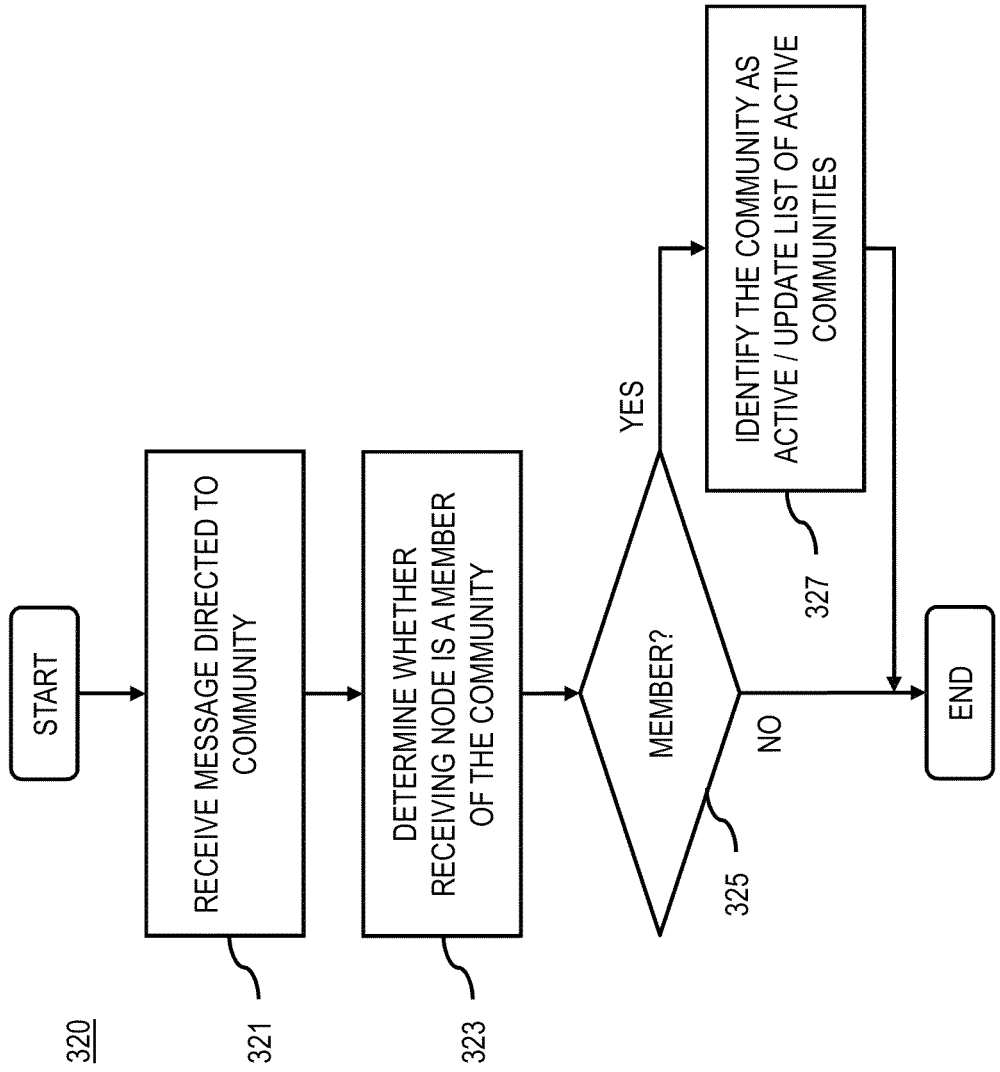

FIG. 3B is a flowchart of a process for passively identifying an active community by monitoring community messages, according to one embodiment. In one embodiment, the AS module 111 performs the process 320 of FIG. 3B and is implemented in, for instance, a chip set including a processor and a memory as shown in FIG. 14. In step 321, the AS module 111 receives a message directed to one or more communities from a neighboring wireless node 101 over the ad-hoc network 115. The AS module 111 then determines whether the receiving wireless node 101 is a member of the community to which the message is directed (step 323). For example, the determination may involve checking whether the CID contained in, for instance, the message header of the received message matches a CID contained in the community directory 243 of the receiving wireless node 101. In certain embodiments, the CID is anonymized to protect the privacy of the community and its members. In this case, the receiving wireless node 101 is a member of the community, the AS module 111 may decode the anonymized CID using the authentication key associated with the CID of the community specified in the received message. Further, if the message is encrypted, the AS module 111 may open the encryption using the encryption key associated with the CID as listed in the community directory 243. If the AS module 111 determines that the receiving node 111 is a member of the community (step 325), the module 111 identifies the community as an active community and updates the list of active communities accordingly (step 327).

FIG. 3C is a flowchart of a process for actively searching for one or more active communities using a community search message, according to an exemplary embodiment. In one embodiment, the AS module 111 performs the process 340 of FIG. 3C and is implemented in, for instance, a chip set including a processor and a memory as shown in FIG. 14. In step 341, the AS module 111 receives input requesting a search for one or more active communities in the local neighborhood of the ad-hoc network 115. The input is received from, for instance, the application 103 through the application programming interface 225 (as described with respect to FIGS. 2A and 2C). For example, the input may specify one or more communities for which to search. In response, the AS module 111 retrieves a CID for each requested community (step 343). In certain embodiments, the CIDs are anonymized to protect the privacy of the community and its members (step 345). Using anonymized CIDs protects privacy by making it more difficult for an outsider to track communications related to any particular community. The community control module 241 then generates a community search message containing a containing a unique community query identifier CQID and a list of anonymized CIDs (step 347).

After creating the message, the AS module 111 initiates broadcast of the message over the ad-hoc network 115 (step 349). In various embodiments, the community search message is equivalent to a query and is transmitted and replied to using the processes described with respect to FIGS. 5A and 5B below. As the message propagates over the ad-hoc network 115, mobile devices that are members of one or more of the active communities associated with the anonymized CID or CIDs included in the message automatically respond to mobile device that originally sent the message. The AS module 111 initiates receipt of the reply messages (step 351). The reply message contains, for instance, a list of anonymized CIDs of those searched communities which have an "active" status in the replying node 101. Based on this list, the AS module 111 identifies each community in the list as an active community and updates the list of active communities in, for instance, the community directory 243 (step 353).

FIG. 3D is a flowchart of a process for actively determining the presence and community-specific identity (e.g., alias) of members of a particular community or communities, according to an exemplary embodiment. In one embodiment, the AS module 111 performs the process 360 of FIG. 3D and is implemented in, for instance, a chip set including a processor and a memory as shown in FIG. 14. In step 361, the AS module 111 receives input requesting a search for one or more members of a community. The input is received from, for instance, the application 103 through the application programming interface 225 (as described with respect to FIGS. 2A and 2C). For example, the input may specify one or more communities whose members are to be searched for. In step 363, the AS module 111 retrieves the CID or CIDs associated with the requested community or communities from the community directory 243. In certain embodiments, the CIDs are anonymized to protect the privacy of the community and its members (step 365). If any one of the communities is set in the "visible" state, the AS module 111 also retrieves the community-specific user identity (e.g., an alias) of the user for that community. By way of example, the encryption/decryption module 245 of the AS module 111 may also encrypt the user alias in step 365 using, for instance, one or more of the keys associated with each community in the community directory 243. The community control module 241 then generates a member search message containing a unique community query identifier CQID, a list of anonymized CIDs, and corresponding plaintext (in case of a public community) or encrypted (in case of a private community) aliases of the members for which to search (step 367).

After the member search message is generated, the AS module 111 initiates broadcast of the member search message over the ad-hoc network 115 (step 369). In various embodiments, the member search message is equivalent to a query and is transmitted and replied to using the processes described with respect to FIGS. 5A and 5B below. As the message propagates over the ad-hoc network 115, mobile devices that have one or more communities associated with the anonymized CID or CIDs in the "visible" state automatically respond to the mobile device that originally sent the message. If aliases corresponding to one or more users are also included in member search message, mobile devices corresponding to the user aliases also respond. The AS module 111 initiates receipt of the reply messages sent in response to the member search message (step 371). The reply message includes, for instance, a list of anonymized CIDs, plaintext or encrypted user aliases and, possibly, the plaintext or encrypted status (e.g. activity state, mode, etc.) of the community member. In certain embodiments, the AS module 111 uses the reply messages to update the list of visible community members in the local neighborhood (step 373). In addition, the AS module 111 also uses the replies to identify active communities within the neighborhood and to update the list of active communities (step 375). The updates are based, for instance, on the anonymized CIDs, the community-specific member identity (e.g., alias), o other member-specific information included in the reply messages.

Figure 4:
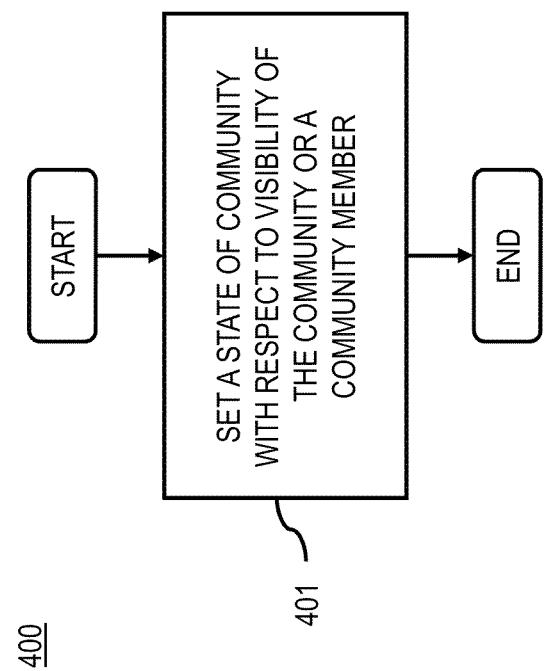
FIG. 4 is a flowchart of a process for setting a state of a community to change the visibility of community or community member, according to an embodiment.

FIG. 4 is a flowchart of a process for setting a state of a community to change the visibility of community or community member, according to an exemplary embodiment. In one embodiment, the AS module 111 performs the process 400 and is implemented in, for instance, a chip set including a processor and a memory as shown in FIG. 14. In step 401, the AS module 111 enables the user to set a state corresponding to a community that determines the visibility of the community or a member of the community. The different states of the community and how the state affects the visibility of status of the community are discussed with respect to FIG. 2D. For example, in various embodiments, when a community is active, it is capable of sending and receiving community specific messages. Similarly, when a community member is visible, the user alias associated with the community member can be queried and sent to other community members.

Moreover, it is contemplated that the state of a community in a wireless node 101 can be used to filter incoming messages. For example, to block all incoming or outgoing messages, a user can set the state of a community to inactive so that all messages from that particular community are disregarded. It is contemplated that a user belonging to multiple communities may independently set the visibility state for each community. By way of example, to block incoming advertisements, the user can set the state to inactive for the community sending the advertisements. It is also contemplated that the user can automatically set the visibility state based on criteria such as time (e.g., to automatically set a visibility state at certain periods of the day), location (e.g., to automatically set a visibility state at certain locations such as work or school), or any other context (e.g., while in a meeting or at dinner).

Figure 5A:
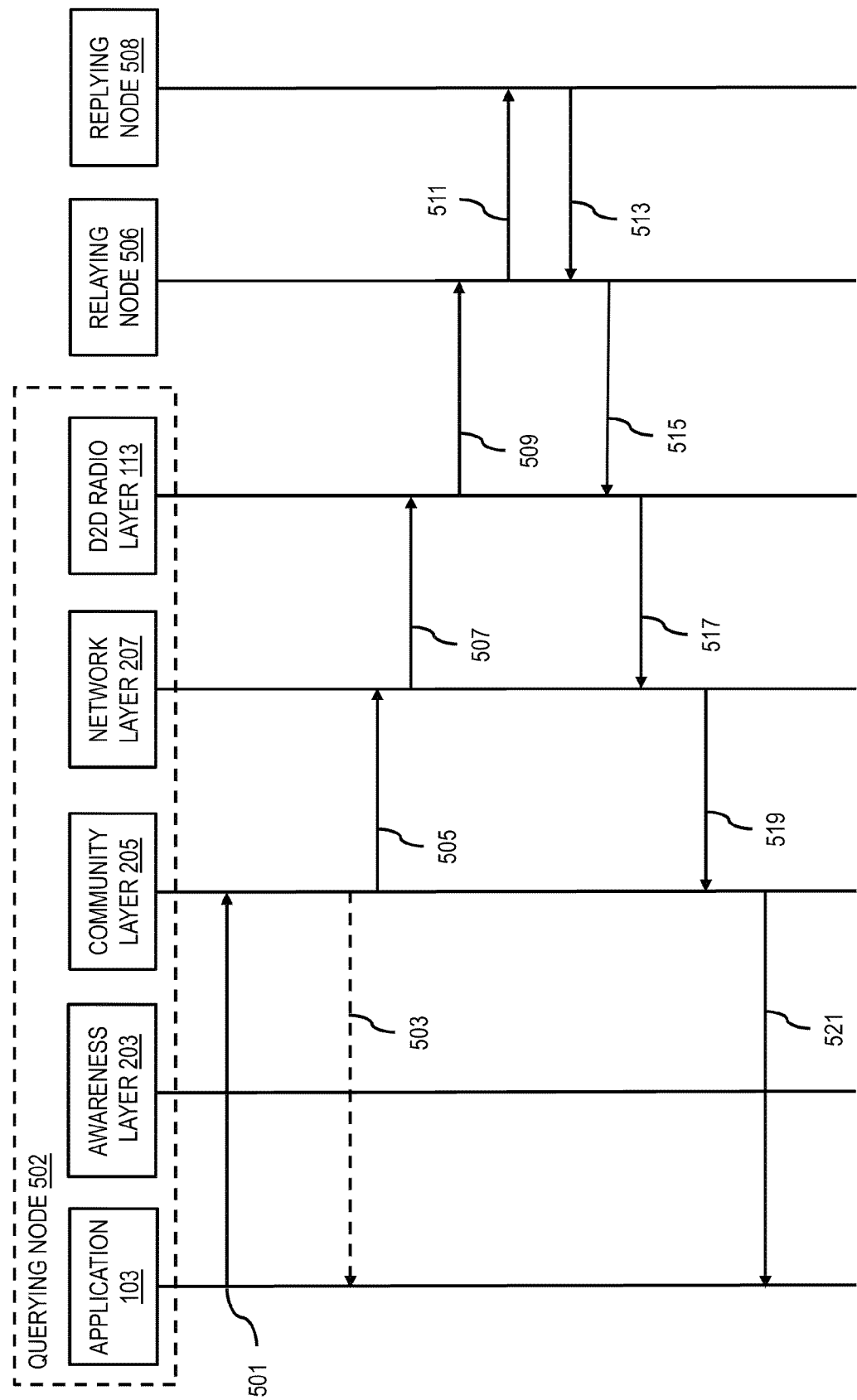
FIG. 5A is a ladder diagram that illustrates a sequence of messages and processes used in a querying node, according to an embodiment.

FIG. 5A is a ladder diagram that illustrates a sequence of messages and processes used in a querying node, according to an exemplary embodiment. A network process is represented by a thin vertical line. A step or message passed from one process to another is represented by horizontal arrows. A dashed horizontal arrow represents an optional step or message. The processes represented in FIG. 5A are the querying node 502, relaying node 506, and replying node 508. Within querying node 502, the following additional processes are represented: application 103, awareness layer 203, community layer 205, network layer 207, and D2D radio layer 113.

In step 501, the application 103 within querying node 502 generates a request for searching community information (e.g., UEs 101 having active communities or communities with visible members) over the ad-hoc network 115 and sends the request to the community layer 205 of the querying node 502. The community layer 205 generates a community query message, assigns a community query identification number (CQID) to the query message and prepares the query message for transmission over the ad-hoc network 115 by marking the query with CIDs of the communities from which the user is seeking information. If the user seeks information on members of the communities and the communities are private, the community layer 205 encrypts the community-specific user identity (e.g., alias) using the encryption keys associated with the respective CID and stored in the community directory 243 (FIG. 2C). If the community directory 243 contains recent information about active communities in other nodes then the community layer 205 may return the community information (step 503). The community layer 205 then sends the anonymized and partly encrypted message to the network layer 207 (step 505).

The network layer 207 assigns a message sequence number (MID) to the query message and adds fields to the network layer message header 281 (FIG. 2F) to indicate that the querying node 502 is the source and transmitter of the query message (e.g., using the NID). The network layer 207 sends the query message to the D2D radio layer 113 of the querying node 502 for broadcasting in the ad-hoc network 115 (step 507).

The query message is then broadcasted to one or more relaying nodes 506 (step 509). All the nodes that are able to receive the broadcast message are relaying nodes. After processing by the relaying node 506, the query message is rebroadcasted to another relaying node or to the replying node 508 (step 511). The processes of the replying node 508 are described with respect to FIG. 5C. After processing of the query message by the replying node 508, a reply message is generated and sent to the relaying node 506 (step 513) which routes the reply message either to another relaying node or to the querying node 502 (step 515) based on the route stored in the routing table 273.

At the querying node 502, the D2D radio layer 113 receives and acknowledges the reply message and forwards the reply message to the network layer 207 (step 517). The network layer 207 determines that the querying node 502 is the intended destination of the reply message by checking the DST field 294 in the network layer message header 281 and sends the message to the community layer 205 for processing (step 519). In case of a private community, the community layer 205 decrypts the reply message using the appropriate encryption keys stored in the community directory 243. Based on the information in the reply message, the community layer 205 updates information in the community directory 243 (list of active communities and the lists of visible members in the communities) and finally sends a service response to the query to the application 103 (step 521).

Figure 5B:
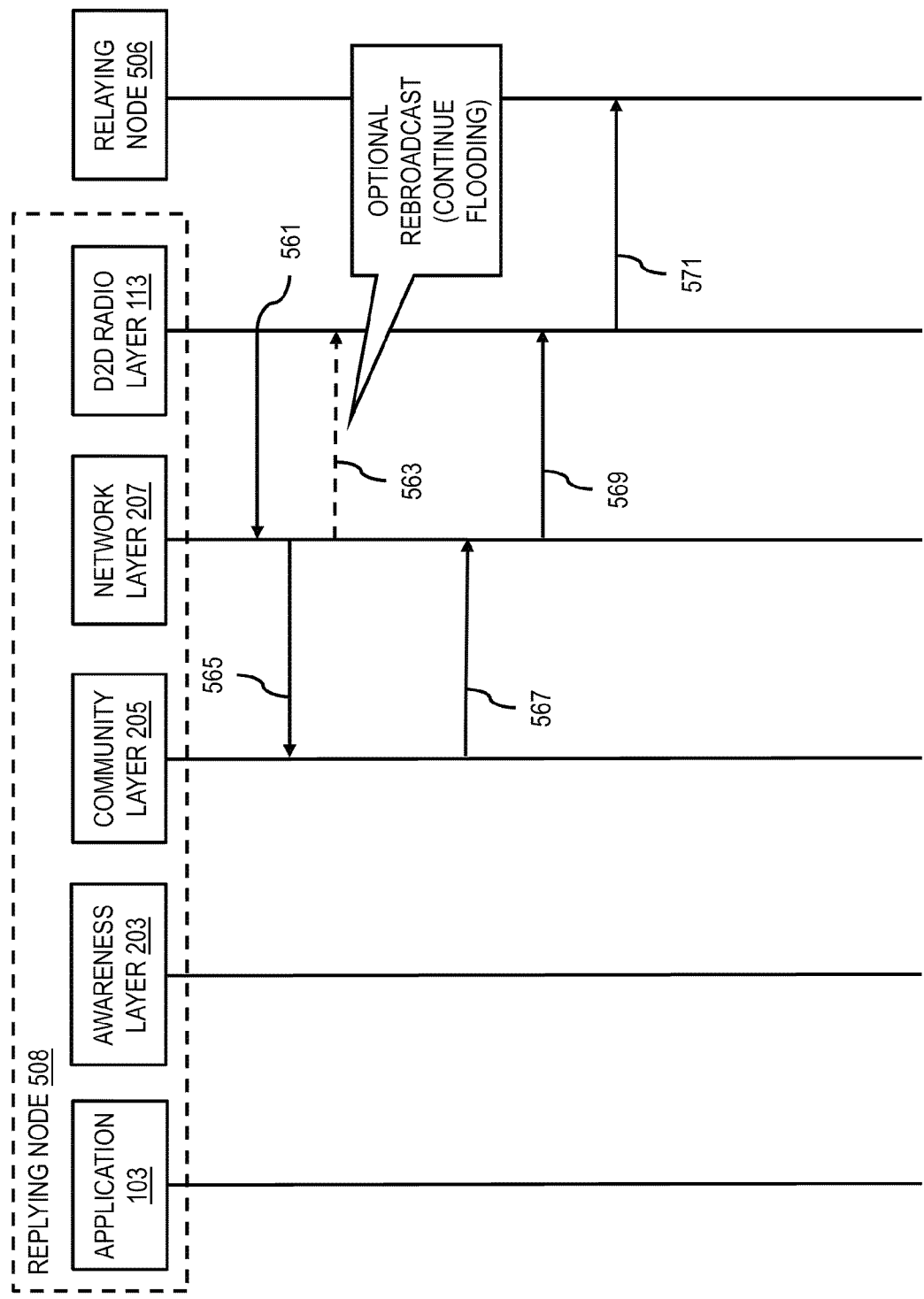
FIG. 5B is a ladder diagram that illustrates a sequence of messages and processes used in a replying node, according to an embodiment.

FIG. 5B is a ladder diagram that illustrates a sequence of messages and processes used in a replying node, according to an exemplary embodiment. A network process is represented by a thin vertical line. A step or message passed from one process to another is represented by horizontal arrows. A dashed horizontal arrow represents an optional step or message. The processes represented in FIG. 5B are the replying node 508 and the querying node 502. Within replying node 508, the following additional processes are represented: application 103, awareness layer 203, community layer 205, network layer 207, and D2D radio layer 113.

In step 561, the D2D radio layer 113 of the replying node 508 receives the query message and forwards it to the network layer 207 of the replying node 508. The network layer 207 may decide to rebroadcast the query message (step 563). On receipt, the network layer 207 forwards the query message to the community layer 205 (step 565).

If the community layer 205 determines that the query message contains one or more anonymized CIDs of the active communities associated with the replying node 508 and the query message contains encrypted user aliases, the community layer 205 decrypts the message and updates information in its community directory 243 (e.g., containing the list of active communities and the list of visible members of the communities). Next, the community layer 205 generates a reply message that contains the same CQID as the incoming query and has the source NID of the query message set as the destination NID of the reply message. If the query requests visible user aliases and the user alias in the node 508 is set as visible then the community layer 205 encrypts the user alias with the encryption keys associated with the community. The community layer 205 then retrieves a new anonymized CID from the community directory 243 and sends the reply message to the network layer 207 (step 567).

On receipt of the reply message, the network layer 207 assigns a new message sequence number (MSN) to the reply message, attaches the NID of the replying node 508 as the source and transmitter, finds the NID of the relaying node 506 for the next hop from the routing table 263, sets the receive NID of the reply message as the next hop and sends the reply message to the D2D radio layer 113 (step 569). The D2D radio layer 113 sends the reply message as a unicast message addressed to a relaying node 506 over the ad-hoc network 115 (step 571).

FIGS. 6A-6B are diagrams of a user interface utilized in the process of locating communities over an ad-hoc network, according to various embodiments. FIG. 6A depicts a user interface 600 listing community related information and commands for managing and accessing awareness information. For example, section 601 lists community members who are nearby the wireless node 101. The members may be from one or more different communities. Selecting a member enables a user to contact the member, view the status of the member, or access other applications or functions related to the user. Section 603 may display, for instance, status commands or prompts such as an invitation to join a particular community. User interface 600 also provides selectable menu options 605 to initiate additional commands. For example, selecting the option "Around Me" prompts the display of a map 607 with the locations of community members.

FIG. 6B depicts a user interface 620 for managing communities. For instance, section 621 displays currently defined communities with an option 623 to activate or deactivate each community individually. Users may also designate each community as either public or private using the control 625. Members of each community are displayed in section 627, along with controls 629 for adding or removing members.

Figure 7:
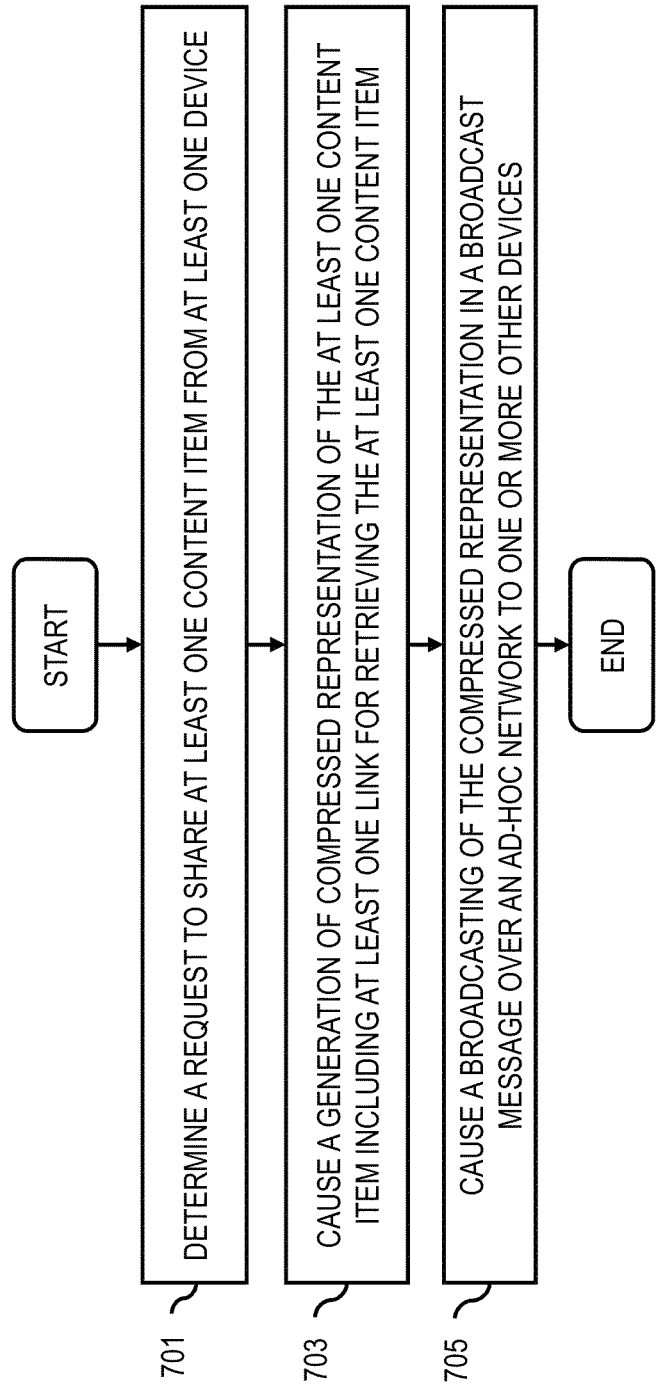
FIGS. 7 and 8 illustrate flowcharts of various processes for, at least, broadcasting and receiving messages for content sharing among devices via an ad-hoc network; according to various embodiments.
Figure 8:
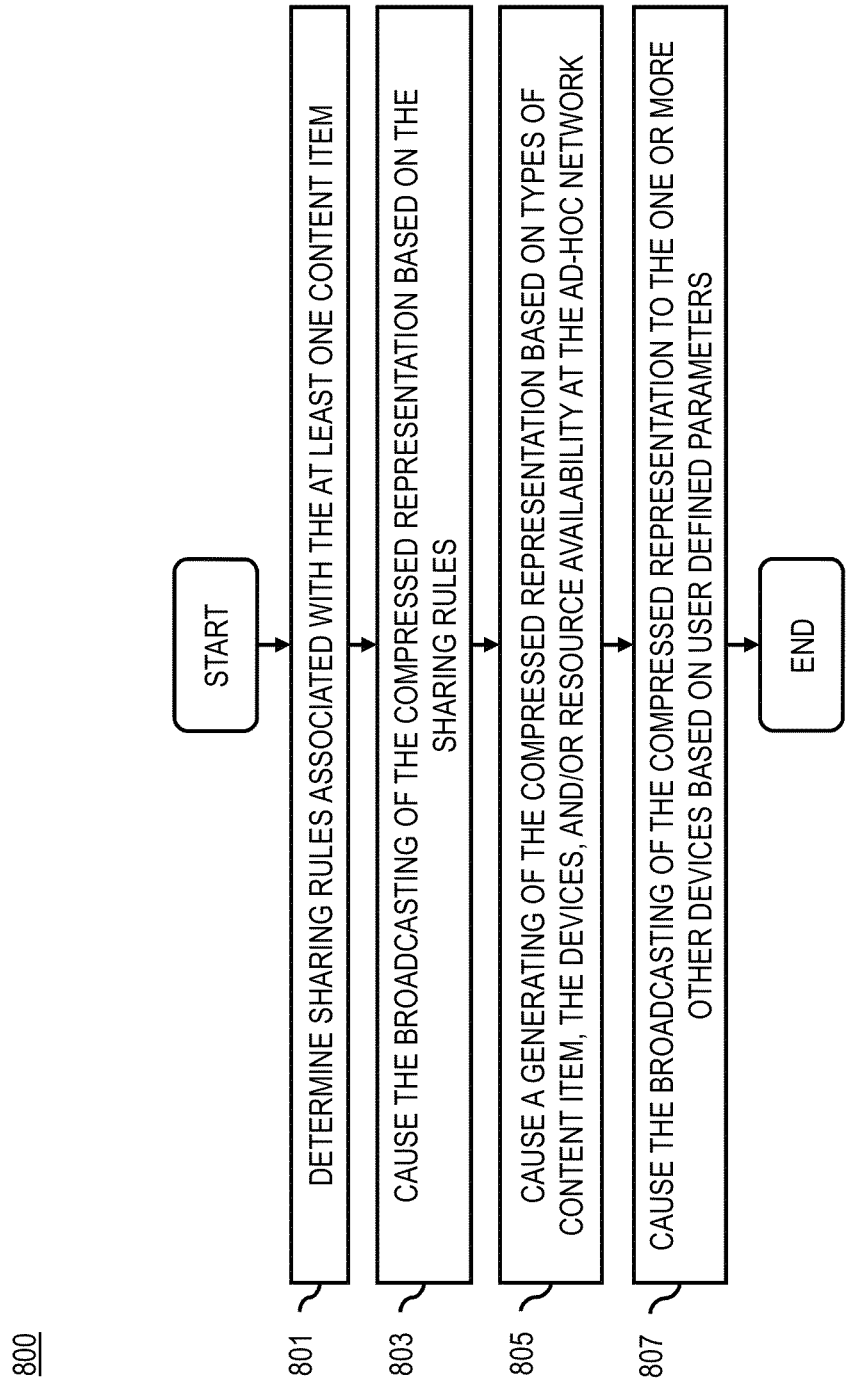

FIGS. 7 and 8 illustrate flowcharts of various processes for, at least, broadcasting and receiving messages for content sharing among devices via an ad-hoc network, according to various embodiments. In various embodiments, the AS module 111 may perform processes 700 and 800 that may be implemented in, for instance, a chip set including a processor and a memory as shown in FIG. 14. As such, the AS module 111 can provide means for accomplishing various parts of the process 700 and 800 as well as means for accomplishing other processes in conjunction with other components of the system 100. Throughout this process, the AS module 111 is referred to as completing various portions of the processes 700 and 800, however, it is understood that other components of the system 100 can perform some of and/or all of the process steps. Further, in various embodiments, the AS module 111 may be implemented in one or more entities of the system 100.

In step 701, the AS module 111 determines a request to share at least one content item from at least one device. In one embodiment, the AS module 111 may receive the request from a user via a UI option at a UE 101 indicating that the user wishes to share one or more content items. For example, a user may wish to share a picture he just captured on his UE 101. In one embodiment, the AS module 111 may receive the request via the application 103 at the UE 101 which, for example, may be based on contextual information, location information, trigger conditions, and the like. For example, the application 103 may prompt to share one or more coupons available on a UE 101*a* with other UEs 101 when the UE 101*a* is at a particular location (e.g., at a restaurant), at a particular time (e.g., during lunch), with particular group of users (e.g., any students), and the like.

In step 703, the AS module 111 causes, at least in part, a generation of one or more compressed representations of the at least one content item, the one or more compressed representations including at least one link for retrieving the at least one content item. In one embodiment, the AS module 111 and/or the application 103 may generate a compressed representation (e.g., a summary, a small number of bytes of data, etc.) of the content item available for sharing, wherein the compressed representation may include a sample, an indicator, contextual information, content type, content metadata, and the like, whereby a recipient of the compressed representation may be able to ascertain, at least, some information associated with the content item available for sharing. For example, only a small section of an audio content item (e.g., an audio fragment, a wave form, etc.) may be included, or a picture may be highly minimized, or a sample of a textual content may be shown as simple text, etc.

In step 705, the AS module 111 causes, at least in part, a broadcasting of the one or more compressed representations in one or more broadcast messages over an ad-hoc network to one or more other devices. In one embodiment, the AS module 111 of a UE 101 may generate one or more messages including one or more compressed representations of one or more content items for broadcast via an ad-hoc network to one or more other UEs 101, for example, from a source device to one or more target/destination devices. In one embodiment, the AS module 111 may generate the messages in conjunction with the application 103, wherein the application 103 may determine one or more components of the compressed representations.

In one embodiment, the ad-hoc network operates in a low-power mode of the at least one device, the one or more other devices, or a combination thereof, and wherein the retrieving of the at least one content item operates in a higher-power mode of the at least one device, the one or more other devices, or a combination thereof. In one embodiment, the UEs 101 participating in an ad-hoc network may broadcast and/or receive one or more compressed representations while the UEs 101 operate in a lower-power mode, for example transmit in low-power mode, in order to save battery power, maintain a low interference with other transmissions, control broadcast range, and the like. For example, in a low-power operating mode, the ad-hoc network 115 may allow continuous broadcasting and reception of messages by the UEs 101 in time-synchronized connectionless manner (as depicted in FIG. 2G and in discussion of FIG. 2A) without significant effect on the battery life time. Further, in one embodiment, the UEs 101 may operate in a higher-power mode when transmitting and/or receiving the one or more shared content items via the ad-hoc network. For example, in a higher-power mode, the UEs 101 may operate in a more conventional way of using peer-to-peer wireless radio in a connection-oriented mode, where the content is typically transferred using IP between the UEs 101. In one embodiment, the AS module 111 may facilitate the transmission and/or the reception via one or more other available networks (e.g., WLAN, Bluetooth, NFC, cellular, etc.) that may be capable of (e.g., more power, better bandwidth, more efficient, etc.) receiving and retransmitting the one or more shared content items. In one embodiment, the retrieving is via an Internet Protocol network, a cellular network, or a combination thereof, wherein the IP address of a receiving and/or a transmitting UE 101 and a transmitting component (e.g., a service provider) may be used during the retrieval.

In one embodiment, the one or more compressed representations include one or more identification (ID) codes, one or more UI icon codes, or a combination thereof associated with the one or more compressed representations, the at least one content item, or a combination thereof. In one embodiment, the AS module 111 of a sharing UE 101 may include and/or instead utilize an ID code or a UI icon code to indicate to the receiving UEs 101 as to what a compressed representation and/or a content item may actually be, wherein the receiving UEs 101 may decode the ID and/or UI icon codes (e.g., from a library) and present the associated information and/or icons at the receiving UEs 101. In one embodiment, utilization of the ID and/or UI icon codes may provide for more efficient transactions via the ad-hoc network, for example, smaller message size, less power for transmission, less time on the ad-hoc network, and the like.

In one embodiment, the broadcasting of the one or more compressed representations, the at least one content item, or a combination thereof is based, at least in part, on geo-location, contextual information, or a combination thereof associated with the one or more other devices. For example, an ad-hoc message may indicate that the message may be broadcast within a certain geo-location (e.g., range), or by UEs 101 including certain contextual information associated with the UE 101 and/or a user of the UE 101, and the like. In one embodiment, the at least one content item is available for sharing in substantially real-time. In one embodiment, the one or more compressed representations are valid based, at least in part, on a predetermined duration of time. In one example, a user sharing a content item may indicate a short duration wherein the content item may be available, valid, and/or may be transmitted for sharing. In one embodiment, one or more parameters of the ad-hoc network may allow for content items to be available for sharing for a certain period of time, for example, to avoid aggregated content on the network which can result higher traffic and power consumption by all devices.

Referring to FIG. 8, the process 800 begins at step 801 where the AS module 111 determines one or more sharing rules associated with the at least one content item. In one embodiment, the AS module 111 and/or application 103 on a broadcasting UE 101 (a sharing device) may determine one or more sharing rules, for example, from the UE 101 user preferences, metadata/contextual information of a content to be shared, location of the UE 101, a target recipient group, any security keys, and the like before the content item is broadcast. In one embodiment, the AS module 111 and/or the application 103 may re-determine the sharing rules based on one or more changes/updates to the user profile of a sharing device, geo-location change, change in time, and the like.

In step 803, the AS module 111 causes, at least in part, the broadcasting of the one or more compressed representations based, at least in part, on the one or more sharing rules. In one embodiment, the AS module 111 may determine a broadcast time, location, device power level, and the like.

In step 805, the AS module 111 causes, at least in part, a generating of the one or more compressed representations based, at least in part, on one or more types of the at least one content item, the at least one device, the one or more other devices, resource availability at the ad-hoc network, or a combination thereof. In one embodiment, the at least one content item includes an image, a video, an audio, a textual, or a combination thereof content item type. In one embodiment the AS module 111 may determine the type of the content item to be shared, for example, from metadata associated with the content item and further determine a compressed representation based on the type. In one embodiment, the application 103 may determine the type of the content to be shared and determine the compressed representation. For example, the content to be shared may be an audio file which may need to be sampled for determining an appropriate (e.g., audible, small size, etc.) compressed representation. In one embodiment, a coarser sample (e.g., digitally sampled at a lower rate) of the content item (e.g., audio, image, video, etc.) may be generated for a proper size message in the ad-hoc network.

In step 807, the AS module 111 causes, at least in part, a presentation of the one or more compressed representations at the one or more other devices based, at least in part, on one or more user defined parameters at the one or more other devices. In one embodiment, a user may define one or more parameters/preferences via the AS module 111 for receiving certain types of messages via the ad-hoc network. For example, a user may only wish to receive messages related to sports, automobiles, music, books, cooking, and the like. Further, the user may wish to receive messages that are substantially near real-time (e.g., only a few hops via other UEs 101), that are for a certain interest group (e.g., students of a college), are from a certain nearby location, and the like. In one embodiment, the application 103 may determine one or more parameters of a compressed representation in a message for filtering the messages of the ad-hoc network based on the user defined parameters, user history, user preferences, and the like.

Figure 9:
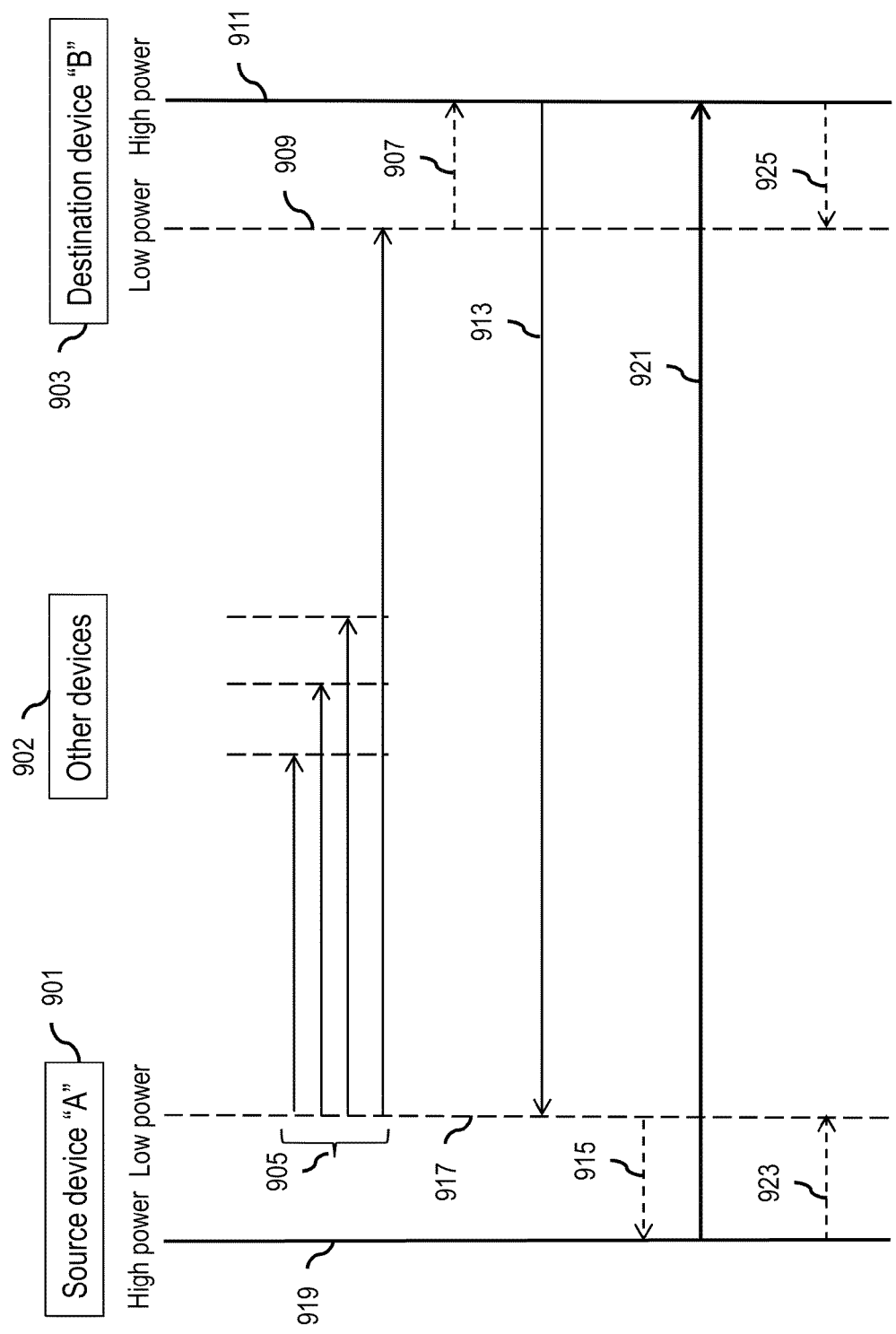
FIG. 9 is a ladder diagram that illustrates sequences of messages and processes used in sharing content via an ad-hoc network, according to an embodiment.

FIG. 9 is a ladder diagram that illustrates sequences of messages and processes used in sharing content via an ad-hoc network, according to an embodiment. In one embodiment, diagram 900 shows a plurality of neighboring devices, for example, source device "A" 901 (source device), other devices 902, and destination device "B" 903 (destination device), wherein the plurality of the devices may communicate with each other via one or more communication networks. In one embodiment, the plurality of devices may be members of an ad-hoc network, whereby they may share information and content items. In one use case scenario, the source device may broadcast to the other devices 902 and to the destination device awareness information messages 905 which may comprise one or more compressed representations (e.g., samples, thumbnails, etc.) of one or more content items available for sharing. For example, the source device may have an image to share, wherein the sample may be a small thumbnail of the image which may be in a lower resolution so that the thumbnail may be transmitted via the ad-hoc network. In one embodiment, a user of and/or an application at the destination device may review the awareness information messages 905 and the included compressed representation of the content item available for sharing, and wish to receive the original/entire content item (e.g., an image, a song, a document, etc.) Further, the destination device, at 907, may switch operating mode from a lower power mode 909 to a higher power mode 911 for sending an awareness message 913 to the source device, which may include various information items, for example, an IP address and a port number of the destination device, a content identifier, and the like. Furthermore, the source device, at 915, may switch from one operating mode (e.g., a lower power) 917 to another operating mode (e.g., a higher power) 919 for establishing a communication channel (e.g., TCP/IP connection) based, at least in part, on the information received via the message 913 from the destination device. At 921, the source device causes a transfer of the requested content item to the destination device, whereupon completion of the transfer, the source device may change its operating mode at 923 and the destination device may change its operating mode at 925.

Figure 10:
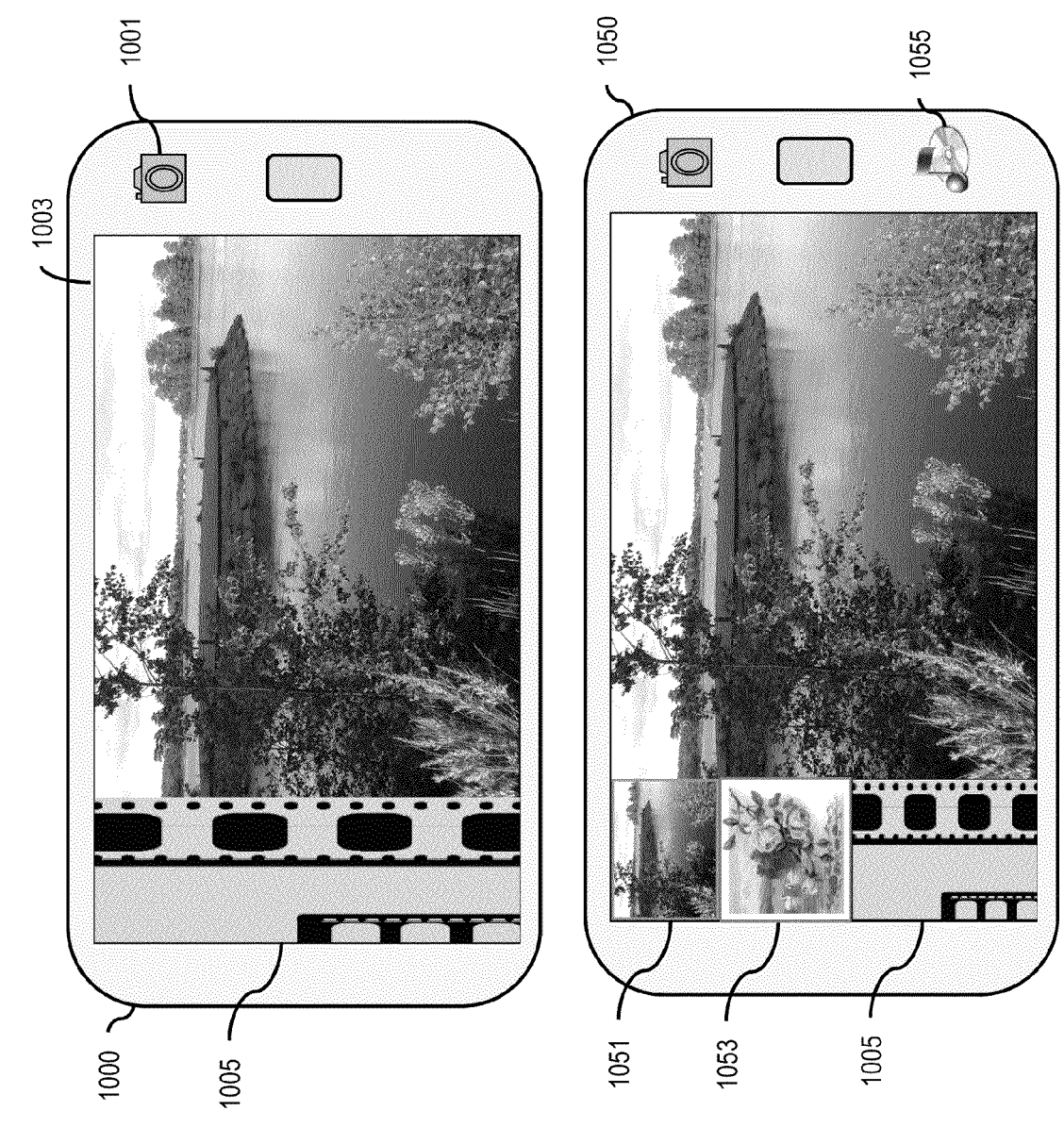
FIGS. 10 and 11 are diagrams of a user interface utilized in the processes of sharing content via an ad-hoc network, according to various embodiments.
Figure 11:

FIGS. 10 and 11 are diagrams of a user interface utilized in the processes of sharing content via an ad-hoc network, according to various embodiments.

FIG. 10 illustrates UIs 1000 and 1050. In one embodiment of the UI 1000 on a UE 101, a user may utilize a camera feature 1001 to capture an image 1003, wherein the UI may also present available images on the device via a UI presentation area 1005, for example, a film strip, a listing, a library, and the like, which may also be available for sharing. In one embodiment, the image 1003 may be presented in the presentation area 1005 as a compressed representation (e.g., a thumbnail) 1051, wherein one or more other compressed representations 1053 of one or more content items (e.g., images) received from one or more other neighboring devices via an ad-hoc network may be presented to the user. In one embodiment, the user, application 103, and/or the AS module 111 may switch from one content type to another via one or more UI features, for example, option 1055 to switch to an audio type content review and/or consumption. In one embodiment, the user may choose to share the captured image 1003 via an ad-hoc network by selecting the compressed representation 1051 and activating the AS module 111. In one embodiment, the AS module 111 may substantially automatically broadcast the compressed representation 1051 via the ad-hoc network, wherein the broadcasting may be based, at least in part, on one or more parameters defined by the user and/or by an ad-hoc network requirements. In one embodiment, the user may select and choose to download the content represented by the thumbnail 1053.

FIG. 11 illustrates UIs 1100 and 1150. In one embodiment of the UI 1100, a user has chosen to download a content item represented by the thumbnail 1053, wherein the AS module 111 may facilitate the downloading, which may be via one or more available communication networks to the UE 101. In UI 1100, downloading information 1101 may indicate a progress of the downloading process, may indicate (e.g., highlight, frame, etc.) the selected thumbnail 1053 as its content item is being downloaded, available actions to the user (e.g. stop downloading via 1103), and the like. In one embodiment, the UE 101 may receive one or more additional compressed representations 1105 (e.g., from one or more neighboring devices) which may be illustrated in the presentation area 1005 in addition to the current compressed representations shown. In UI 1150, the user has received a full version of the requested content item 1151 which was represented by the thumbnail 1053, wherein the user may select from available UI features 1153 to save, delete, forward, edit, and the like.

Figure 12:
FIG. 12 shows a table including various information items which may be included in a content sharing message via an ad-hoc network, according to an embodiment.

FIG. 12 shows a table including various information items which may be included in a content sharing message via an ad-hoc network, according to an embodiment. In one embodiment, table 1200 includes, at least in part, various information items that may be included in an ad-hoc network message whereby one or more compressed representations of one or more content items may be broadcast from one or more devices to one or more other neighboring device. For example, the message may include content name, content type, actual content size (e.g., file size), content file format, content description, thumbnail size, and the like. In various embodiments, the AS modules 111 at broadcasting and at receiving devices may determine/infer certain information items for presentation to users and/or application 103 at the devices for one or more actions. In various embodiments, the AS module 111 and/or the application 103 may utilize the information items in the table 1200 to determine one or more actions, for example, to filter one or more messages based on a content type, size, and the like.

The processes described herein for providing a service or activity in an ad-hoc network 115 may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 13:
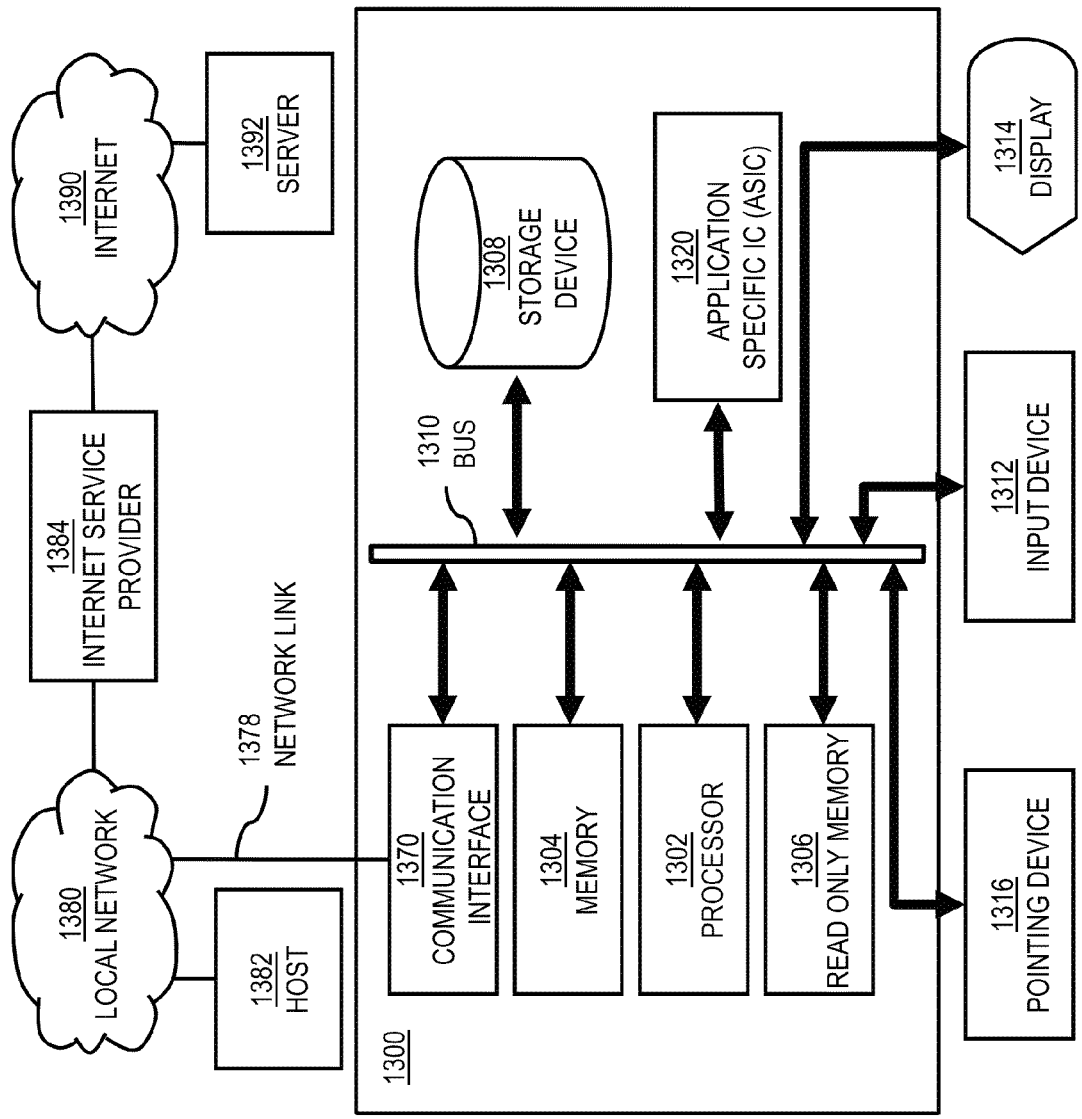
FIG. 13 is a diagram of hardware that can be used to implement an embodiment of the invention.

FIG. 13 illustrates a computer system 1300 upon which an embodiment of the invention may be implemented. Computer system 1300 is programmed to provide a user interface as described herein and includes a communication mechanism such as a bus 1310 for passing information between other internal and external components of the computer system 1300. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1310 includes one or more parallel conductors of information so that information is transferred quickly among devices coupled to the bus 1310. One or more processors 1302 for processing information are coupled with the bus 1310.

A processor 1302 performs a set of operations on information related to providing a service or activity in an ad-hoc network 115. The set of operations include bringing information in from the bus 1310 and placing information on the bus 1310. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1302, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1300 also includes a memory 1304 coupled to bus 1310. The memory 1304, such as a random access memory (RAM) or other dynamic storage device, stores information including processor instructions for providing a service or activity in an ad-hoc network 115. Dynamic memory allows information stored therein to be changed by the computer system 1300. RAM allows a unit of information stored at a location called a memory address to be stored and retrieved independently of information at neighboring addresses. The memory 1304 is also used by the processor 1302 to store temporary values during execution of processor instructions. The computer system 1300 also includes a read only memory (ROM) 1306 or other static storage device coupled to the bus 1310 for storing static information, including instructions, that is not changed by the computer system 1300. Some memory is composed of volatile storage that loses the information stored thereon when power is lost. Also coupled to bus 1310 is a non-volatile (persistent) storage device 1308, such as a magnetic disk, optical disk or flash card, for storing information, including instructions, that persists even when the computer system 1300 is turned off or otherwise loses power.

Information, including instructions for providing a service or activity in an ad-hoc network 115, is provided to the bus 1310 for use by the processor from an external input device 1312, such as a keyboard containing alphanumeric keys operated by a human user, or a sensor. A sensor detects conditions in its vicinity and transforms those detections into physical expression compatible with the measurable phenomenon used to represent information in computer system 1300. Other external devices coupled to bus 1310, used primarily for interacting with humans, include a display device 1314, such as a cathode ray tube (CRT) or a liquid crystal display (LCD), or plasma screen or printer for presenting text or images, and a pointing device 1316, such as a mouse or a trackball or cursor direction keys, or motion sensor, for controlling a position of a small cursor image presented on the display 1314 and issuing commands associated with graphical elements presented on the display 1314. In some embodiments, for example, in embodiments in which the computer system 1300 performs all functions automatically without human input, one or more of external input device 1312, display device 1314 and pointing device 1316 is omitted.

In the illustrated embodiment, special purpose hardware, such as an application specific integrated circuit (ASIC) 1320, is coupled to bus 1310. The special purpose hardware is configured to perform operations not performed by processor 1302 quickly enough for special purposes. Examples of application specific ICs include graphics accelerator cards for generating images for display 1314, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1300 also includes one or more instances of a communications interface 1370 coupled to bus 1310. Communication interface 1370 provides a one-way or two-way communication coupling to a variety of external devices that operate with their own processors, such as printers, scanners and external disks. In general the coupling is with a network link 1378 that is connected to a local network 1380 to which a variety of external devices with their own processors are connected. For example, communication interface 1370 may be a parallel port or a serial port or a universal serial bus (USB) port on a personal computer. In some embodiments, communications interface 1370 is an integrated services digital network (ISDN) card or a digital subscriber line (DSL) card or a telephone modem that provides an information communication connection to a corresponding type of telephone line. In some embodiments, a communication interface 1370 is a cable modem that converts signals on bus 1310 into signals for a communication connection over a coaxial cable or into optical signals for a communication connection over a fiber optic cable. As another example, communications interface 1370 may be a local area network (LAN) card to provide a data communication connection to a compatible LAN, such as Ethernet. Wireless links may also be implemented. For wireless links, the communications interface 1370 sends or receives or both sends and receives electrical, acoustic or electromagnetic signals, including infrared and optical signals, that carry information streams, such as digital data. For example, in wireless handheld devices, such as mobile telephones like cell phones, the communications interface 1370 includes a radio band electromagnetic transmitter and receiver called a radio transceiver. In various embodiments, the communications interface 1370 enables connection to the communication network 109 for providing a service or activity in an ad-hoc network 115.

The term computer-readable medium is used herein to refer to any medium that participates in providing information to processor 1302, including instructions for execution. Such a medium may take many forms, including, but not limited to, non-volatile media, volatile media and transmission media. Non-volatile media include, for example, optical or magnetic disks, such as storage device 1308. Volatile media include, for example, dynamic memory 1304. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 14 illustrates a chip set 1400 upon which an embodiment of the invention may be implemented. Chip set 1400 is programmed to provide awareness information over an ad-hoc network 115 as described herein and includes, for instance, the processor and memory components described with respect to FIG. 14 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, the chip set 1400 includes a communication mechanism such as a bus 1401 for passing information among the components of the chip set 1400. A processor 1403 has connectivity to the bus 1401 to execute instructions and process information stored in, for example, a memory 1405. The processor 1403 may include one or more processing cores with each core configured to perform independently. A multi-core processor enables multiprocessing within a single physical package. Examples of a multi-core processor include two, four, eight, or greater numbers of processing cores. Alternatively or in addition, the processor 1403 may include one or more microprocessors configured in tandem via the bus 1401 to enable independent execution of instructions, pipelining, and multithreading. The processor 1403 may also be accompanied with one or more specialized components to perform certain processing functions and tasks such as one or more digital signal processors (DSP) 1407, or one or more application-specific integrated circuits (ASIC) 1409. A DSP 1407 typically is configured to process real-world signals (e.g., sound) in real time independently of the processor 1403. Similarly, an ASIC 1409 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1403 and accompanying components have connectivity to the memory 1405 via the bus 1401. The memory 1405 includes both dynamic memory (e.g., RAM, magnetic disk, writable optical disk, etc.) and static memory (e.g., ROM, CD-ROM, etc.) for storing executable instructions that when executed perform the inventive steps described herein to provide awareness information over an ad-hoc network 115. The memory 1405 also stores the data associated with or generated by the execution of the inventive steps.

Figure 15:
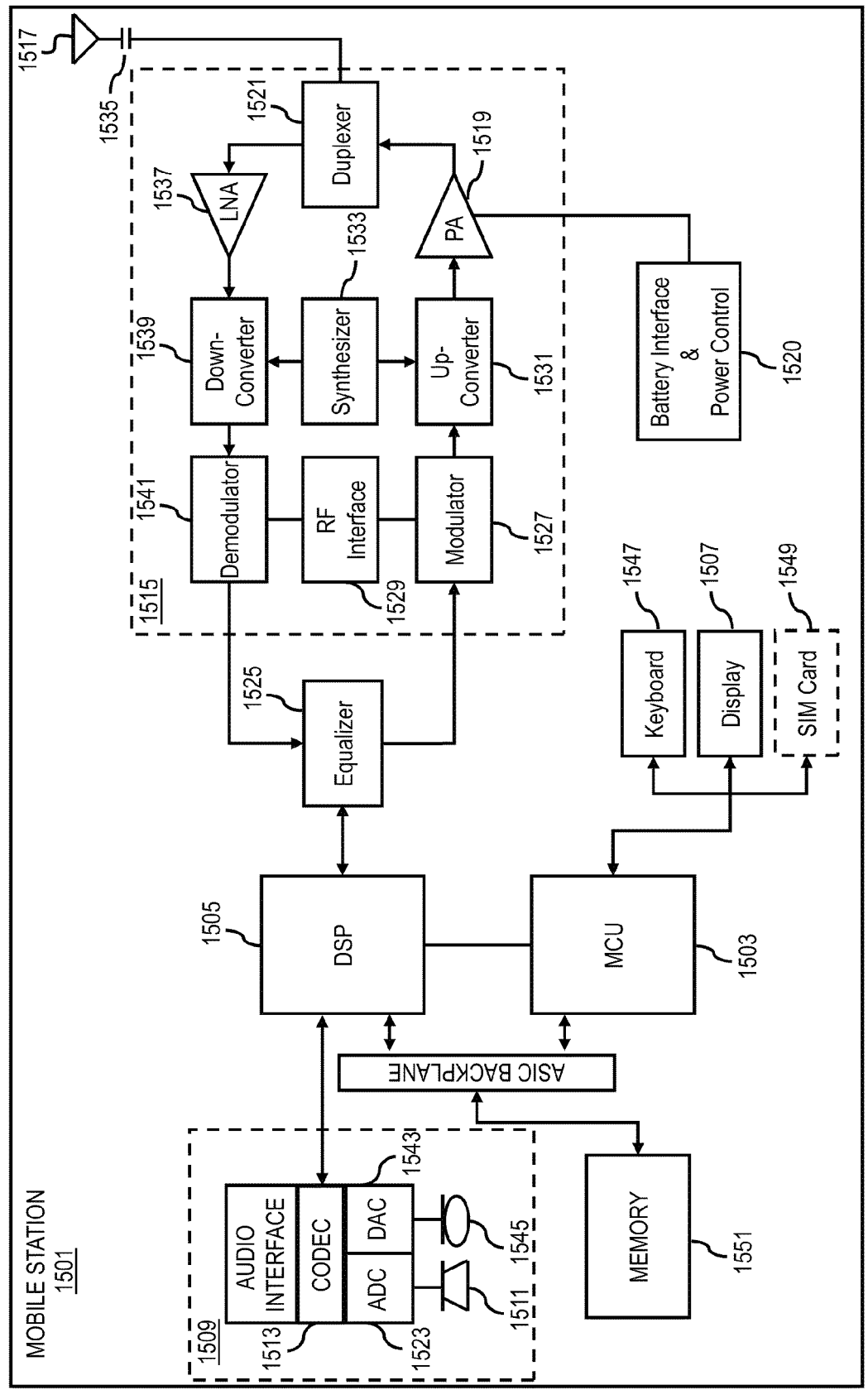
FIG. 15 is a diagram of a mobile station (e.g., handset) that can be used to implement an embodiment of the invention.

FIG. 15 is a diagram of exemplary components of a mobile station (e.g., handset) capable of operating in the system of FIG. 1, according to an exemplary embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1503, a Digital Signal Processor (DSP) 1505, and a receiver/transmitter unit including a microphone gain control unit and a speaker gain control unit. A main display unit 1507 provides a display to the user in support of various applications and mobile station functions such as the AS module 111. An audio function circuitry 1509 includes a microphone 1511 and microphone amplifier that amplifies the speech signal output from the microphone 1511. The amplified speech signal output from the microphone 1511 is fed to a coder/decoder (CODEC) 1513.

A radio section 1515 amplifies power and converts frequency in order to communicate with a base station, which is included in a mobile communication system, via antenna

1517. The power amplifier (PA) 1519 and the transmitter/modulation circuitry are operationally responsive to the MCU 1503, with an output from the PA 1519 coupled to the duplexer 1521 or circulator or antenna switch, as known in the art. The PA 1519 also couples to a battery interface and power control unit 1520.

In use, a user of mobile station 1501 speaks into the microphone 1511 and his or her voice along with any detected background noise is converted into an analog voltage. The analog voltage is then converted into a digital signal through the Analog to Digital Converter (ADC) 1523. The control unit 1503 routes the digital signal into the DSP 1505 for processing therein, such as speech encoding, channel encoding, encrypting, and interleaving. In the exemplary embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1525 for compensation of any frequency-dependent impairments that occur during transmission though the air such as phase and amplitude distortion. After equalizing the bit stream, the modulator 1527 combines the signal with a RF signal generated in the RF interface 1529. The modulator 1527 generates a sine wave by way of frequency or phase modulation. In order to prepare the signal for transmission, an up-converter 1531 combines the sine wave output from the modulator 1527 with another sine wave generated by a synthesizer 1533 to achieve the desired frequency of transmission. The signal is then sent through a PA 1519 to increase the signal to an appropriate power level. In practical systems, the PA 1519 acts as a variable gain amplifier whose gain is controlled by the DSP 1505 from information received from a network base station. The signal is then filtered within the duplexer 1521 and optionally sent to an antenna coupler 1535 to match impedances to provide maximum power transfer. Finally, the signal is transmitted via antenna 1517 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1501 are received via antenna 1517 and immediately amplified by a low noise amplifier (LNA) 1537. A down-converter 1539 lowers the carrier frequency while the demodulator 1541 strips away the RF leaving only a digital bit stream. The signal then goes through the equalizer 1525 and is processed by the DSP 1505. A Digital to Analog Converter (DAC) 1543 converts the signal and the resulting output is transmitted to the user through the speaker 1545, all under control of a Main Control Unit (MCU) 1503—which can be implemented as a Central Processing Unit (CPU) (not shown).

The MCU 1503 receives various signals including input signals from the keyboard 1547. The keyboard 1547 and/or the MCU 1503 in combination with other user input components (e.g., the microphone 1511) comprise a user interface circuitry for managing user input. The MCU 1503 runs a user interface software to facilitate user control of at least some functions of the mobile station 1501. The MCU 1503 also delivers a display command and a switch command to the display 1507 and to the speech output switching controller, respectively. Further, the MCU 1503 exchanges information with the DSP 1505 and can access an optionally incorporated SIM card 1549 and a memory 1551. In addition, the MCU 1503 executes various control functions required of the station. The DSP 1505 may, depending upon the implementation, perform any of a variety of conventional digital processing functions on the voice signals. Additionally, DSP 1505 determines the background noise level of the local environment from the signals detected by microphone 1511 and sets the gain of microphone 1511 to a level selected to compensate for the natural tendency of the user of the mobile station 1501.

The CODEC 1513 includes the ADC 1523 and DAC 1543. The memory 1551 stores various data including call incoming tone data and is capable of storing other data including music data received via, e.g., the global Internet. The software module could reside in RAM memory, flash memory, registers, or any other form of writable storage medium known in the art. The memory device 1551 may be, but not limited to, a single memory, CD, DVD, ROM, RAM, EEPROM, optical storage, or any other non-volatile storage medium capable of storing digital data.

An optionally incorporated SIM card 1549 carries, for instance, important information, such as the cellular phone number, the carrier supplying service, subscription details, and security information. The SIM card 1549 serves primarily to identify the mobile station 1501 on a radio network. The card 1549 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:
   at least one determination of a request to share at least one content item from at least one device;
   a generation of one or more compressed representations of the at least one content item, the one or more compressed representations including at least one link for retrieving the at least one content item; and
   a broadcasting of the one or more compressed representations in one or more broadcast messages over an ad-hoc network to one or more other devices,
   wherein the ad-hoc network operates in a low-power mode of the at least one device, the one or more other devices, or a combination thereof, and wherein the retrieving of the at least one content item operates in a higher-power mode of the at least one device, the one or more other devices, or a combination thereof.

2. The method of claim 1, wherein the retrieving is via an Internet Protocol network, a cellular network, or a combination thereof.

3. The method of claim 1, wherein the (1) data and/or (2) information and/or (3) at least one signal are further based, at least in part, on the following:
   at least one determination of one or more sharing rules associated with the at least one content item; and the broadcasting of the one or more compressed representations based, at least in part, on the one or more sharing rules.

4. The method of claim 1, wherein the (1) data and/or (2) information and/or (3) at least one signal are further based, at least in part, on the following:
a generating of the one or more compressed representations based, at least in part, on one or more types of the at least one content item, the at least one device, the one or more other devices, resource availability at the ad-hoc network, or a combination thereof.

5. A method of claim 4, wherein the at least one content item includes an image, a video, an audio, a textual, or a combination thereof content item type.

6. The method of claim 1, wherein the one or more compressed representations include one or more identification codes, one or more user interface icon codes, or a combination thereof associated with the one or more compressed representations, the at least one content item, or a combination thereof.

7. The method of claim 1, wherein the (1) data and/or (2) information and/or (3) at least one signal are further based, at least in part, on the following:
a presentation of the one or more compressed representations at the one or more other devices based, at least in part, on one or more user defined parameters at the one or more other devices.

8. The method of claim 1, wherein the broadcasting of the one or more compressed representations, the at least one content item, or a combination thereof is based, at least in part, on geo-location, contextual information, or a combination thereof associated with the one or more other devices.

9. The method of claim 1, wherein the one or more compressed representations are valid based, at least in part, on a predetermined duration of time.

10. An apparatus of comprising:
at least one processor; and
at least one memory including computer program code for one or more programs, the at least one memory and the computer program code configured to, with the at least one processor, cause the apparatus to perform at least the following,
determine a request to share at least one content item from at least one device;
cause, at least in part, a generation of one or more compressed representations of the at least one content item, the one or more compressed representations including at least one link for retrieving the at least one content item; and
cause, at least in part, a broadcasting of the one or more compressed representations in one or more broadcast messages over an ad-hoc network to one or more other devices,
wherein the ad-hoc network operates in a low-power mode of the at least one device, the one or more other devices, or a combination thereof, and wherein the retrieving of the at least one content item operates in a higher-power mode of the at least one device, the one or more other devices, or a combination thereof.

11. The apparatus of claim 10, wherein the retrieving is via an Internet Protocol network, a cellular network, or a combination thereof.

12. The apparatus of claim 10, wherein the apparatus is further caused to:
determine one or more sharing rules associated with the at least one content item; and
cause, at least in part, the broadcasting of the one or more compressed representations based, at least in part, on the one or more sharing rules.

13. The apparatus of claim 10, wherein the apparatus is further caused to:
cause, at least in part, a generating of the one or more compressed representations based, at least in part, on one or more types of the at least one content item, the at least one device, the one or more other devices, resource availability at the ad-hoc network, or a combination thereof.

14. An apparatus of claim 13, wherein the at least one content item includes an image, a video, an audio, a textual, or a combination thereof content item type.

15. The apparatus of claim 10, wherein the one or more compressed representations include one or more identification codes, one or more user interface icon codes, or a combination thereof associated with the one or more compressed representations, the at least one content item, or a combination thereof.

16. The apparatus of claim 10, wherein the apparatus is further caused to:
cause, at least in part, a presentation of the one or more compressed representations at the one or more other devices based, at least in part, on one or more user defined parameters at the one or more other devices.

17. The apparatus of claim 10, wherein the broadcasting of the one or more compressed representations, the at least one content item, or a combination thereof is based, at least in part, on geo-location, contextual information, or a combination thereof associated with the one or more other devices.

18. The apparatus of claim 10, wherein the one or more compressed representations are valid based, at least in part, on a predetermined duration of time.

* * * * *